United States Patent
Uematsu et al.

(10) Patent No.: US 7,384,204 B2
(45) Date of Patent: Jun. 10, 2008

(54) ELECTRONIC CAMERA

(75) Inventors: Kimio Uematsu, Fuji (JP); Naoyuki Murakami, Kawasaki (JP)

(73) Assignee: Nikon Corporation, Tokyo (JP)

( * ) Notice: Subject to any disclaimer, the term of this patent is extended or adjusted under 35 U.S.C. 154(b) by 198 days.

(21) Appl. No.: 11/108,871

(22) Filed: Apr. 19, 2005

(65) Prior Publication Data
US 2005/0238346 A1 Oct. 27, 2005

(30) Foreign Application Priority Data

Apr. 23, 2004 (JP) ............................. 2004-128563
Jan. 27, 2005 (JP) ............................. 2005-020092

(51) Int. Cl.
*G03B 19/12* (2006.01)
*G03B 9/08* (2006.01)

(52) U.S. Cl. ...................................... 396/358; 396/452
(58) Field of Classification Search ................ 396/452, 396/457, 354, 358
See application file for complete search history.

(56) References Cited

U.S. PATENT DOCUMENTS

| | | | | |
|---|---|---|---|---|
| 2,016,058 A | * | 10/1935 | Steiner | ........................ 396/447 |
| 3,533,343 A | * | 10/1970 | Ueda et al. | ................... 396/447 |
| 4,758,859 A | * | 7/1988 | Uematsu et al. | ............. 396/213 |
| 5,574,522 A | * | 11/1996 | Matsukawa | .................. 396/411 |
| 5,598,244 A | * | 1/1997 | Johansson | .................... 396/495 |

FOREIGN PATENT DOCUMENTS

JP A 11-122542 4/1999

* cited by examiner

*Primary Examiner*—Christopher Mahoney
(74) *Attorney, Agent, or Firm*—Oliff & Berridge, PLC

(57) ABSTRACT

As a shutter release button is pressed down, a front end portion of a sequence drive lever moves toward the rear side and, as a result, a mirror-up lever is caused to rotate to the right by the force applied from a mirror up spring. In this state, a mirror drive end presses a mirror drive pin upward to raise a main mirror. In addition, a shutter drive end comes in contact with a shutter drive boss at a switching lever to push the shutter drive boss upward, thereby pulling the shutter blades downward. During a reset operation, the front end portion moves to the front side causing the mirror-up lever to rotate to the left. The main mirror is thus lowered. Since the switching lever is caused to rotate to the right with the force applied from a switching lever reset spring, the shutter blades are pulled upward to shield an opening.

23 Claims, 21 Drawing Sheets

PRIOR TO PHOTOGRAPHING OPERATION START

VIEW FROM DIRECTION INDICATED WITH ARROW A

VIEW FROM DIRECTION INDICATED WITH ARROW B

AFTER SHUTTER RELEASE

VIEW FROM DIRECTION
INDICATED WITH
ARROW A

VIEW FROM DIRECTION
INDICATED WITH
ARROW B

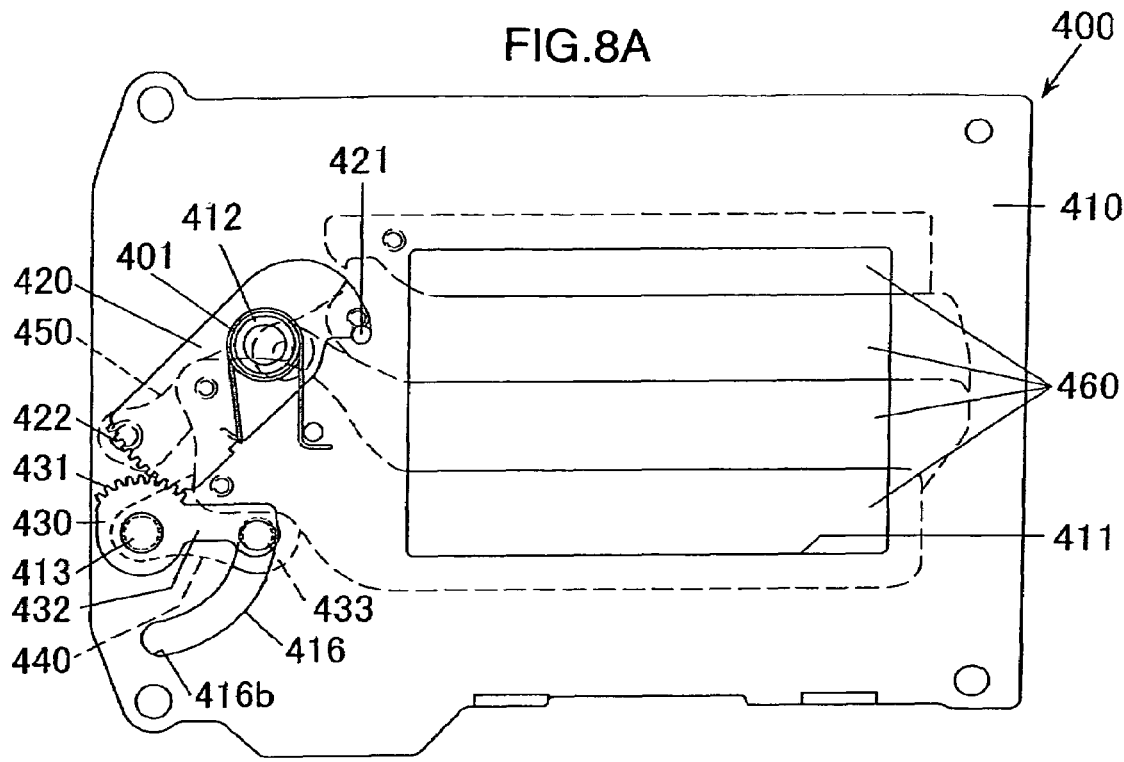
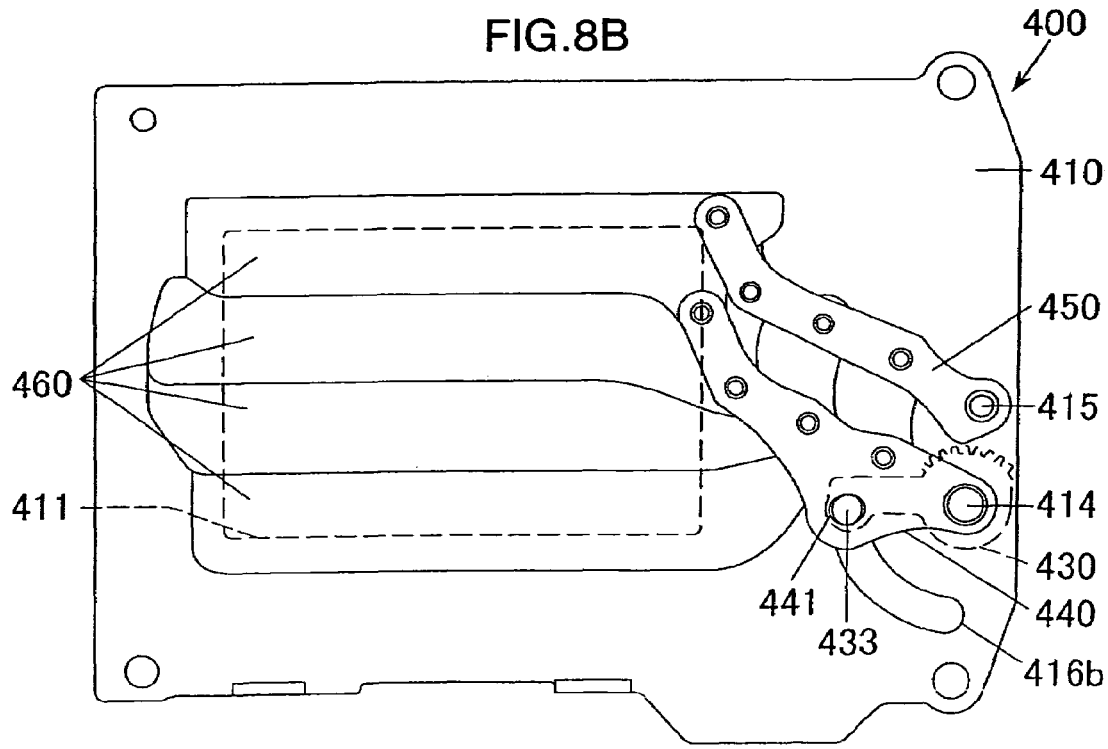

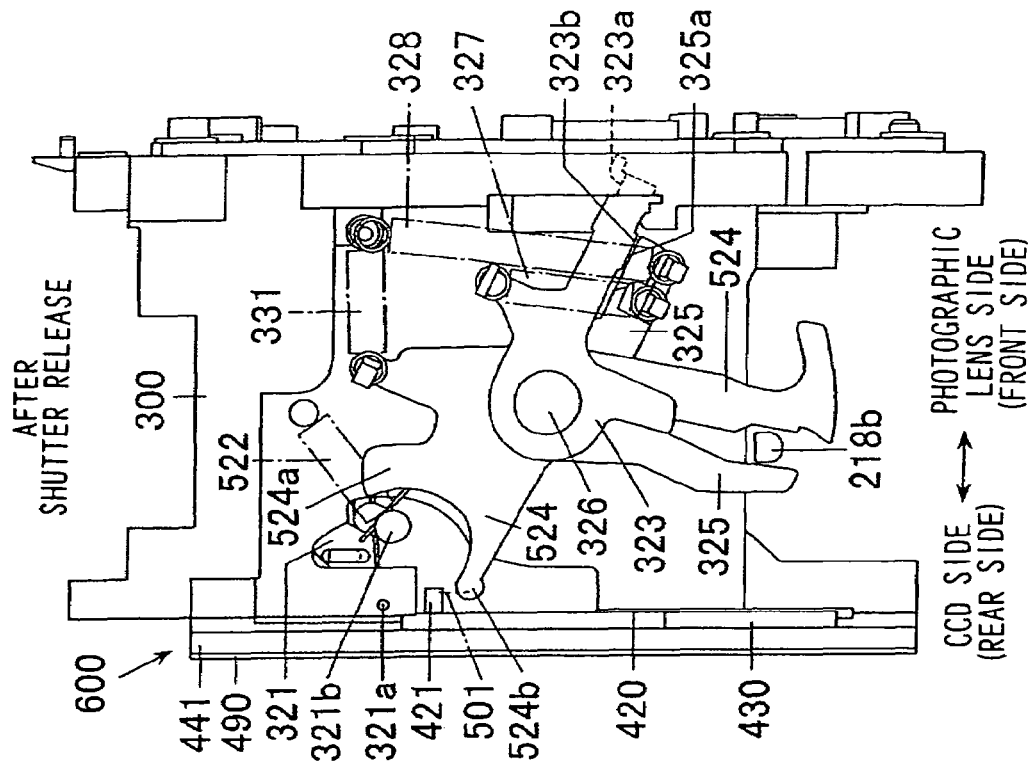
FIG.10A PRIOR TO PHOTOGRAPHING OPERATION START
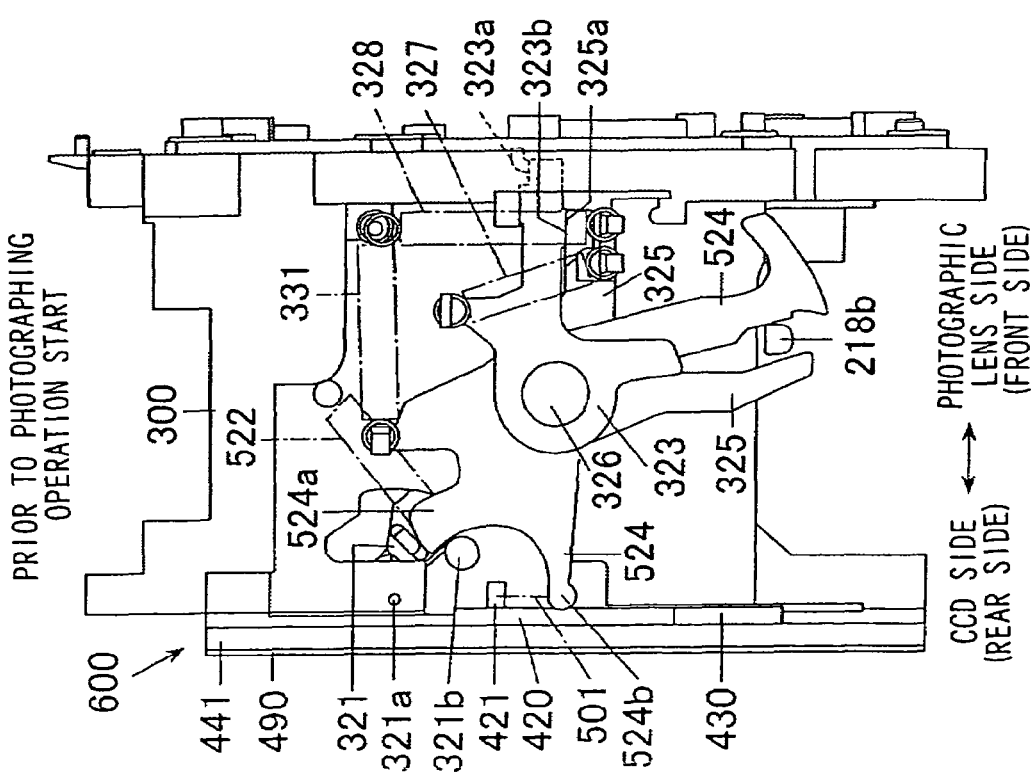
FIG.10B AFTER SHUTTER RELEASE

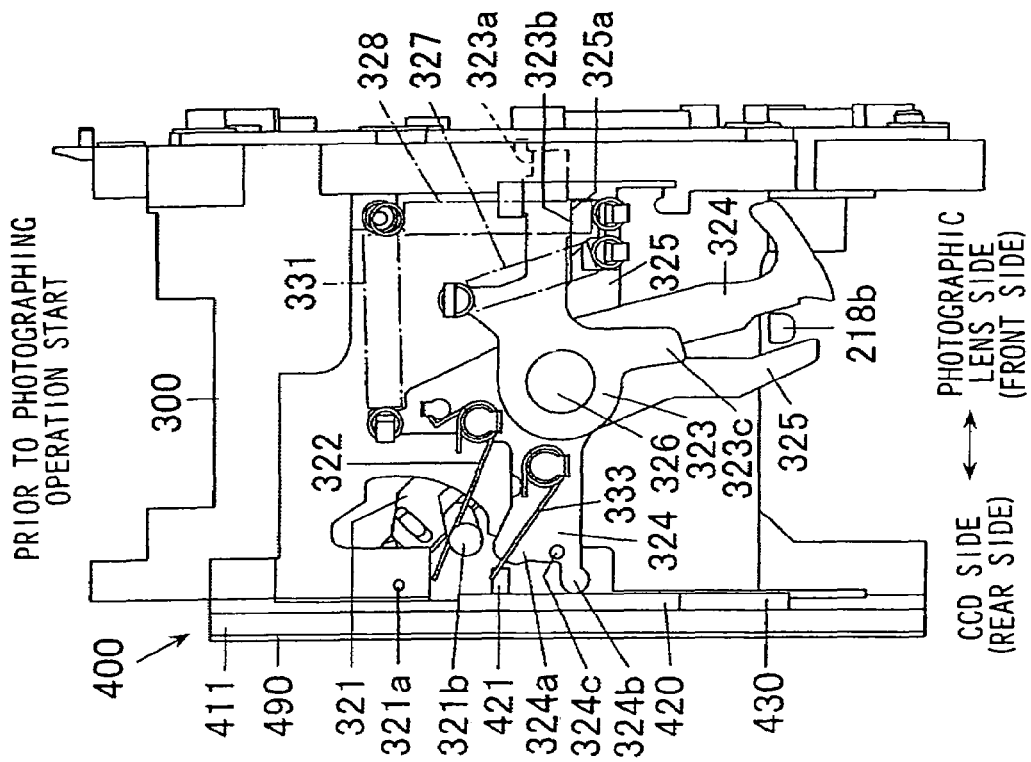

FIG.18A
VIEW FROM DIRECTION INDICATED WITH ARROW A
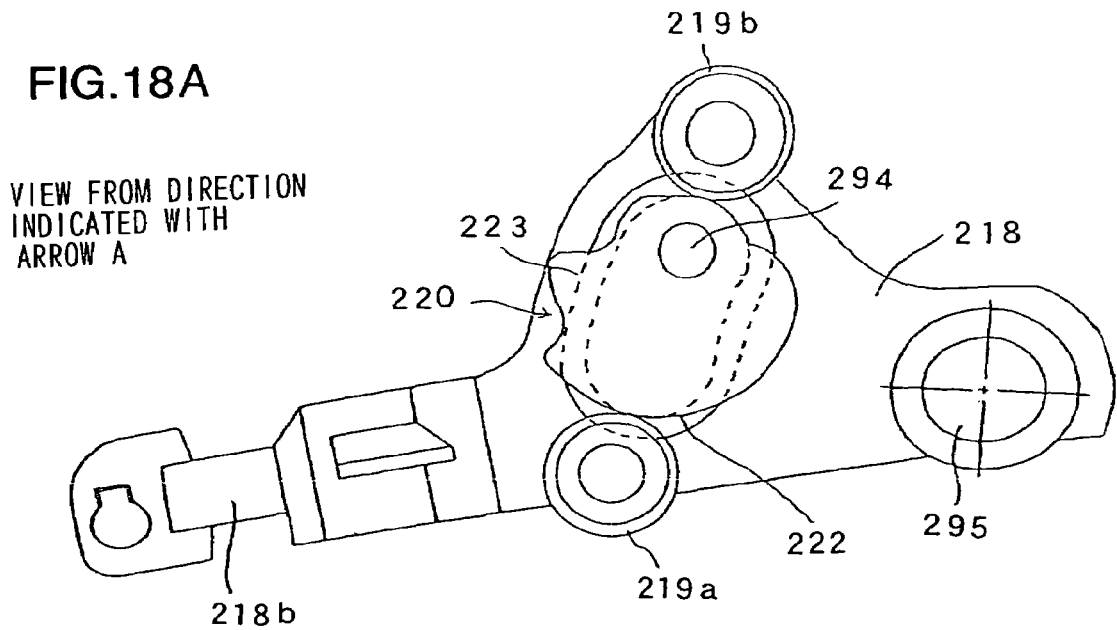
PRIOR TO PHOTOGRAPHING OPERATION START
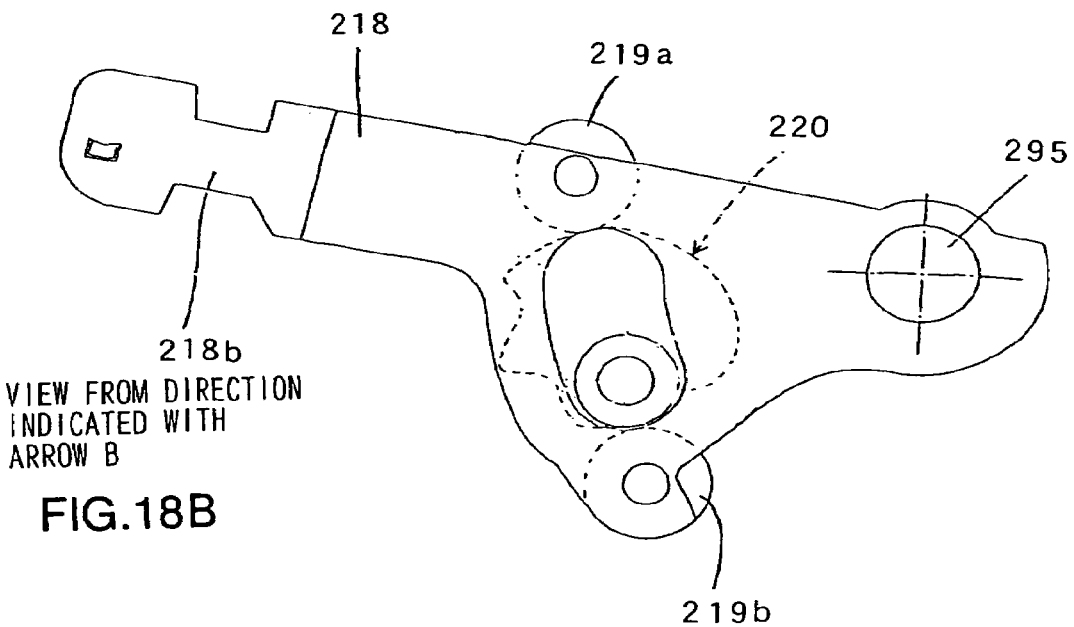
VIEW FROM DIRECTION INDICATED WITH ARROW B
FIG.18B

AFTER SHUTTER RELEASE

VIEW FROM DIRECTION INDICATED WITH ARROW A

VIEW FROM DIRECTION INDICATED WITH ARROW B

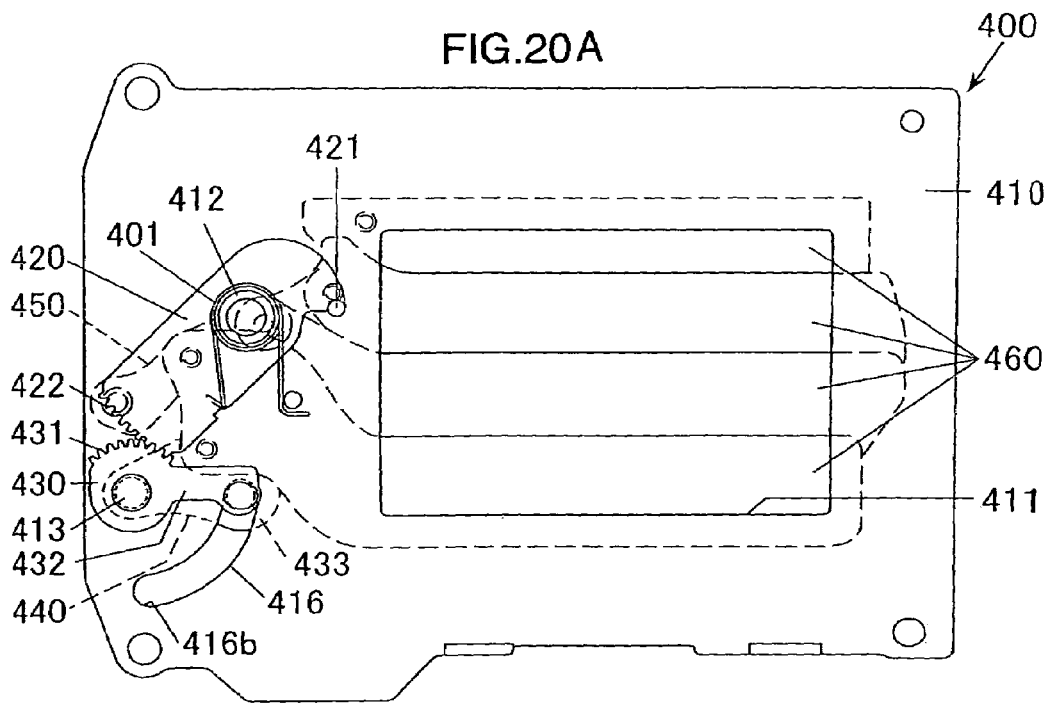
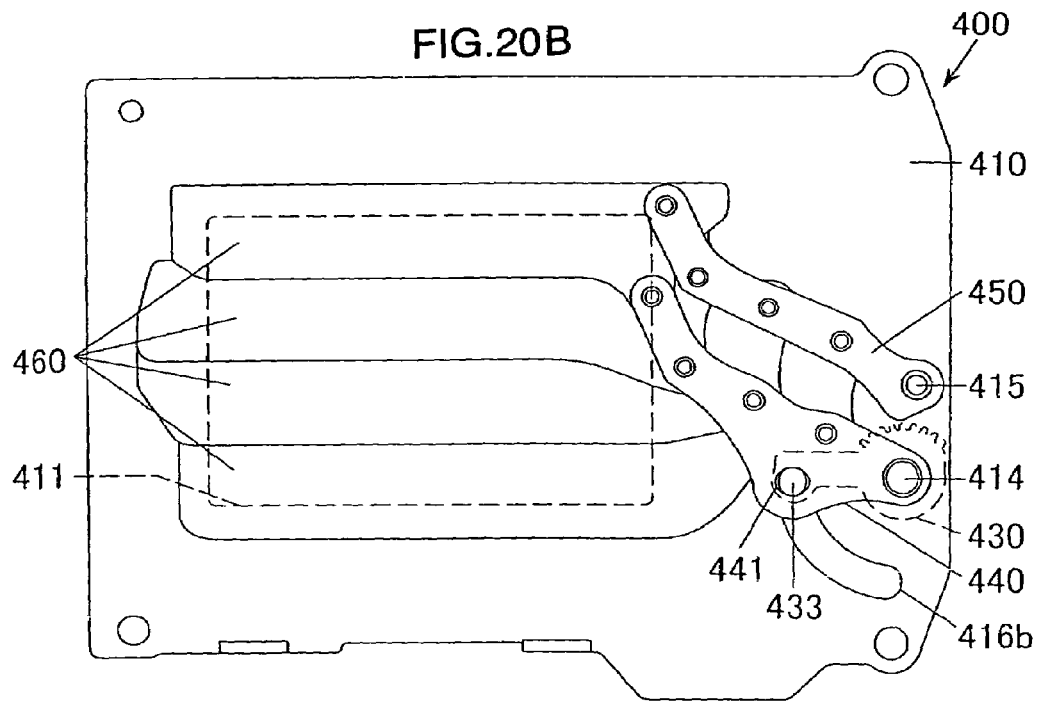

ELECTRONIC CAMERA

INCORPORATION BY REFERENCE

The disclosures of the following priority applications are herein incorporated by reference:
Japanese Patent Application No. 2004-128563 filed Apr. 23, 2004
Japanese Patent Application No. 2005-020092 filed Jan. 27, 2005

BACKGROUND OF THE INVENTION

1. Field of the Invention

The present invention relates to an electronic camera that obtains image signals by forming a subject image at a solid image-capturing element.

2. Description of Related Art

There is an electronic camera known in the related art having a solid image-capturing element constituted with a CCD, which reads out electrical charges stored at the CCD and records the electrical charges thus read out into a recording medium as image information. In an electronic camera that includes a specific type of CCD such as a frame transfer type CCD or an interline 2-field read out type CCD, the electrical charge read needs to be executed by shielding the CCD from light. In an electronic camera having another type of CCD, too, the read needs to be executed with the CCD shielded from light in a similar manner in order to achieve a higher image quality by effectively preventing the so-called smear phenomenon, in which electrical charges overflowing from the CCD pixels enter the transfer unit and streaks of light are generated along the vertical direction in the image plane. The electronic camera disclosed in Japanese Laid Open Patent Publication No. H11-122542, which includes a shutter mechanism for opening/closing a set of shutter blades, addresses this need by shielding the image-capturing element from light until an electrical charge storage starts, opening the photographic opening during the electrical charge storage and then shielding the image-capturing element from light again once the electrical charge storage is completed.

The electronic camera described above includes a plurality of levers and the like and a plurality of springs for driving the shutter blades to allow the use of a focal plane shutter device in the related art in conjunction with the electronic camera. These levers and the like are held at their initial positions against the forces applied by the springs prior to a photographing operation start. Once the photographing operation starts, the levers having been held are sequentially released, thereby opening the shutter. When the electrical charge storage is completed, the levers and the like are reset to the initial positions and thus the shutter is closed. Such an electronic camera in the related art needs to include parts such as drive cams for driving the levers and the springs in addition to the plurality of levers and springs, which means that the number of required parts is large to give rise to problems related to the cost and the parts mounting space.

SUMMARY OF THE INVENTION

An electronic camera according to a first aspect of the present invention includes a mirror that is driven to one of a down position placing the mirror in a photographic optical path to guide a subject image to a viewfinder and an up position placing the mirror outside the photographic optical path to allow the subject image to pass to an image-capturing element, a set of shutter blades to be engaged in an opening/closing operation to enter one of a closed state in which the image-capturing element is shielded from light and an open state in which the subject image is guided to the image-capturing element, a drive source that outputs a drive force to be used to drive the mirror, a mirror drive mechanism that transmits the drive force generated at the drive source to the mirror, and a shutter drive mechanism that engages the shutter blades in the opening operation by using a drive force used to raise the mirror with the mirror drive mechanism.

A shutter device of an electronic camera according to a second aspect of the present invention includes a set of shutter blades to be engaged in an opening/closing operation to enter one of a closed state in which an image-capturing element is shielded from light and an open state in which a subject image is guided to the image-capturing element, and a shutter drive mechanism that engages the shutter blades in the opening operation by using a drive force used to raise a mirror with a mirror drive mechanism that drives the mirror from a down position placing the mirror in a photographic optical path to guide the subject image to a viewfinder to an up position placing the mirror outside the photographic optical path to allow the subject image to pass to the image-capturing element. The shutter drive mechanism includes an opening member that engages the shutter blades in the opening operation by transmitting the drive force from the mirror drive mechanism to the shutter blades.

A mirror drive device of an electronic camera according to a third aspect of the present invention includes a mirror that is driven to one of a down position placing the mirror in a photographic optical path to guide a subject image to a viewfinder and an up position placing the mirror outside the photographic optical path to allow the subject image to pass to an image-capturing element, and a mirror drive mechanism that transmits a drive force generated at a drive source to the mirror. The mirror drive mechanism includes a transmission member that communicates a drive force for raising the mirror to a shutter drive mechanism that engages a set of shutter blades in an opening operation so as to guide the subject image to the image-capturing element by using the drive force used to raise the mirror with the mirror drive mechanism.

In the electronic camera of the first aspect, it is preferable that the opening operation of the shutter blades starts immediately before the mirror driven to switch from the down position to the up position assumes the up position and is completed by the time the mirror assumes the up position. A drive force with which the shutter blades are engaged in the closing operation by following a mirror down operation may be charged by the shutter drive mechanism through use of the drive force with which the mirror is raised by the mirror drive mechanism.

In the mirror drive device of the third aspect, it is preferable that the mirror drive mechanism transmits to the shutter drive mechanism the drive force used to raise the mirror immediately before the mirror driven to switch from the down position to the up position actually assumes the up position.

An electronic camera according to a fourth aspect of the present invention includes a mirror that is driven to one of a down position placing the mirror in a photographic optical path to guide a subject image to a viewfinder and an up position placing the mirror outside the photographic optical path to guide the subject image to an image-capturing element, a set of shutter blades to be engaged in an opening/closing operation to enter one of a closed state in which the image-capturing element is shielded from light and an open state in which the subject image is guided to the image-capturing element, a drive source that outputs a drive force to be used to drive the mirror, a mirror drive mechanism that transmits the drive force generated at the drive source to the mirror, and a shutter drive mechanism that engages the shutter blades in the closing operation by using a drive force used to lower the mirror with the mirror drive mechanism.

A shutter device of an electronic camera according to a fifth aspect of the present invention includes a set of shutter blades to be engaged in an opening/closing operation to enter one of a closed state in which an image-capturing element is shielded from light and an open state in which a subject image is guided to the image-capturing element, and a shutter drive mechanism that engages the shutter blades in the closing operation by using a drive force used to lower a mirror with a mirror drive mechanism that drives the mirror from an up position placing the mirror outside a photographic optical path to allow the subject image to pass to the image-capturing element to a down position placing the mirror in the photographic optical path to guide the subject image to a viewfinder. The shutter drive mechanism includes a closing member that engages the shutter blades in the closing operation by transmitting the drive force from the mirror drive mechanism to the shutter blades.

A mirror drive device of an electronic camera according to a sixth aspect of the present invention includes a mirror that is driven to one of a down position placing the mirror in a photographic optical path to guide a subject image to a viewfinder and an up position placing the mirror outside the photographic optical path to allow the subject image to pass to an image-capturing element, and a mirror drive mechanism that transmits a drive force generated at a drive source to the mirror. The mirror drive mechanism includes a transmission member that communicates a drive force for lowering the mirror to a shutter drive mechanism that engages a set of shutter blades in a closing operation so as to shield the image-capturing from light by using the drive force used to lower the mirror with the mirror drive mechanism.

In the electronic camera of the fourth aspect, the opening operation of the shutter blades starts immediately before the mirror driven to switch from the down position to the up position assumes the up position and is completed by the time the mirror assumes the up position. A drive force with which the shutter blades are engaged in the opening operation by following a mirror up operation may be charged with the shutter drive mechanism through use of the drive force with which the mirror is lowered by the mirror drive mechanism.

An electronic camera according to a seventh aspect of the present invention includes a mirror that is driven to one of a down position placing the mirror in a photographic optical path to guide a subject image to a viewfinder and an up position placing the mirror outside the photographic optical path to allow the subject image to pass to an image-capturing element, a set of shutter blades to be engaged in an opening/closing operation to enter one of a closed state in which the image-capturing element is shielded from light and an open state in which the subject image is guided to the image-capturing element, a drive source that outputs a drive force to be used to drive the mirror, a mirror drive mechanism that transmits the drive force generated at the drive source to the mirror, and a shutter drive mechanism that uses a drive force used to raise the mirror with the mirror drive mechanism to engage the shutter blades in the opening operation and uses a drive force used to lower the mirror with the mirror drive mechanism to engage the shutter blades in the closing operation.

A shutter device of an electronic camera according to a eighth aspect of the present invention includes a set of shutter blades to be engaged in an opening/closing operation to enter one of a closed state in which an image-capturing element is shielded from light and an open state in which a subject image is guided to the image-capturing element, and a shutter drive mechanism that engages the shutter blades in the opening operation by using a drive force used to raise a mirror with a mirror drive mechanism so as to drive the mirror to an up position placing the mirror outside a photographic optical path to allow the subject image to pass to the image-capturing element and that engages the shutter blades in the closing operation by using a drive force used to lower the mirror with the mirror drive mechanism so as to drive the mirror to a down position placing the mirror in the photographic optical path to guide the subject image to a viewfinder. The shutter drive mechanism includes an opening/closing member that engages the shutter blades in the opening/closing operation by transmitting the drive force from the mirror drive mechanism to the shutter blades.

A mirror drive device of an electronic camera according to a ninth aspect of the present invention includes a mirror that is driven to one of a down position placing the mirror in a photographic optical path to guide a subject image to a viewfinder and an up position placing the mirror outside the photographic optical path to allow the subject image to pass to an image-capturing element, and a mirror drive mechanism that transmits a drive force generated at a drive source to the mirror. The mirror drive mechanism includes a transmission member that transmits a drive force used to raise the mirror and a drive force used to lower the mirror with the mirror drive mechanism to a shutter drive mechanism that engages a set of shutter blades in an opening operation so as to guide the subject image to the image-capturing element by using the drive force used to raise the mirror and that engages the shutter blades in a closing operation so as to shield the image-capturing element from light by using the drive force used to lower the mirror.

In the electronic camera of the seventh aspect, it is preferable that the opening operation of the shutter blades starts immediately before the mirror driven to switch from the down position to the up position assumes the up position and is completed by the time the mirror member assumes the up position.

In the mirror drive device of the ninth aspect, the mirror drive mechanism may start transmitting to the shutter drive mechanism the drive force for raising the mirror immediately before the mirror driven to switch from the down position to the up position actually assumes the up position.

In the shutter device of any of the second, the fifth and the eighth aspect, the shutter drive mechanism may further include an amplifying mechanism that engages the shutter blades in operation by amplifying an extent of the drive force input thereto when transmitting the drive force from the mirror drive mechanism to the shutter blades.

An electronic camera according to a tenth aspect of the present invention includes a mirror that is driven to one of a down position placing the mirror in a photographic optical path to guide a subject image to a viewfinder and an up position placing the mirror outside the photographic optical path to guide the subject image to an image-capturing element, a set of shutter blades to be engaged in an opening/closing operation to enter one of a closed state in which the image-capturing element is shielded from light and an open state in which the subject image is guided to the image-capturing element, a drive source that outputs a drive force to be used to drive the mirror in response to one of a mirror up start signal and a mirror down start signal input thereto, a mirror drive mechanism that transmits the drive force generated at the drive source to the mirror, a shutter drive mechanism that engages the shutter blades in the opening operation by using a first drive force with which the mirror is raised with the mirror drive mechanism and engages the shutter blades in the closing operation by using a second drive force different from the first drive force, and a startup mechanism that starts the closing operation of the shutter blades with the second drive force ahead of a start of a mirror down operation of the mirror in response to a startup signal input thereto.

In the electronic camera of the tenth aspect, it is preferable that the second drive force is charged by using the first drive force. If the mirror down start signal and the startup signal are output simultaneously, the startup mechanism may start the closing operation of the shutter blades before the mirror drive mechanism lowers the mirror. It is preferable that the startup mechanism includes a combination magnet constituted with a permanent magnet and an electromagnetic coil.

BRIEF DESCRIPTION OF THE DRAWINGS

FIG. 8A is a front view of the shutter mechanism with an opening shielded from light and FIG. 8B is a rear view of the inside of the shutter mechanism with a shutter cover plate removed;

FIGS. 10A and 10B show the electronic camera achieved in a variation of the first embodiment of the present invention with FIG. 10A presenting a side view of the mirror box and the shutter mechanism prior to the photographing operation start and FIG. 10B presenting a side view of the mirror box and the shutter mechanism after the shutter release;

FIGS. 11A and 11B show the electronic camera achieved in yet another variation of the first embodiment of the present invention with FIG. 11A presenting a side view of the mirror box and the shutter mechanism prior to the photographing operation start and FIG. 11B presenting a side view of the mirror box and the shutter mechanism after the shutter release;

FIGS. 18A and 18B show the relationship between a sequence drive lever and a rotational phase of a cam prior to the photographing operation start with FIG. 18A showing the sequence drive lever viewed from the bottom side of the camera body (viewed from the direction indicated with the arrow A in FIG. 17) and FIG. 18B showing the sequence drive lever viewed from the top side of the camera body (viewed from the direction indicated with the arrow B in FIG. 17);

FIG. 20A is a front view of the shutter mechanism with an opening shielded from light and FIG. 20B is a rear view of the inside of the shutter mechanism with the shutter cover plate removed.

DESCRIPTION OF PREFERRED EMBODIMENTS

First Embodiment

Overall Structure

Figure 1:
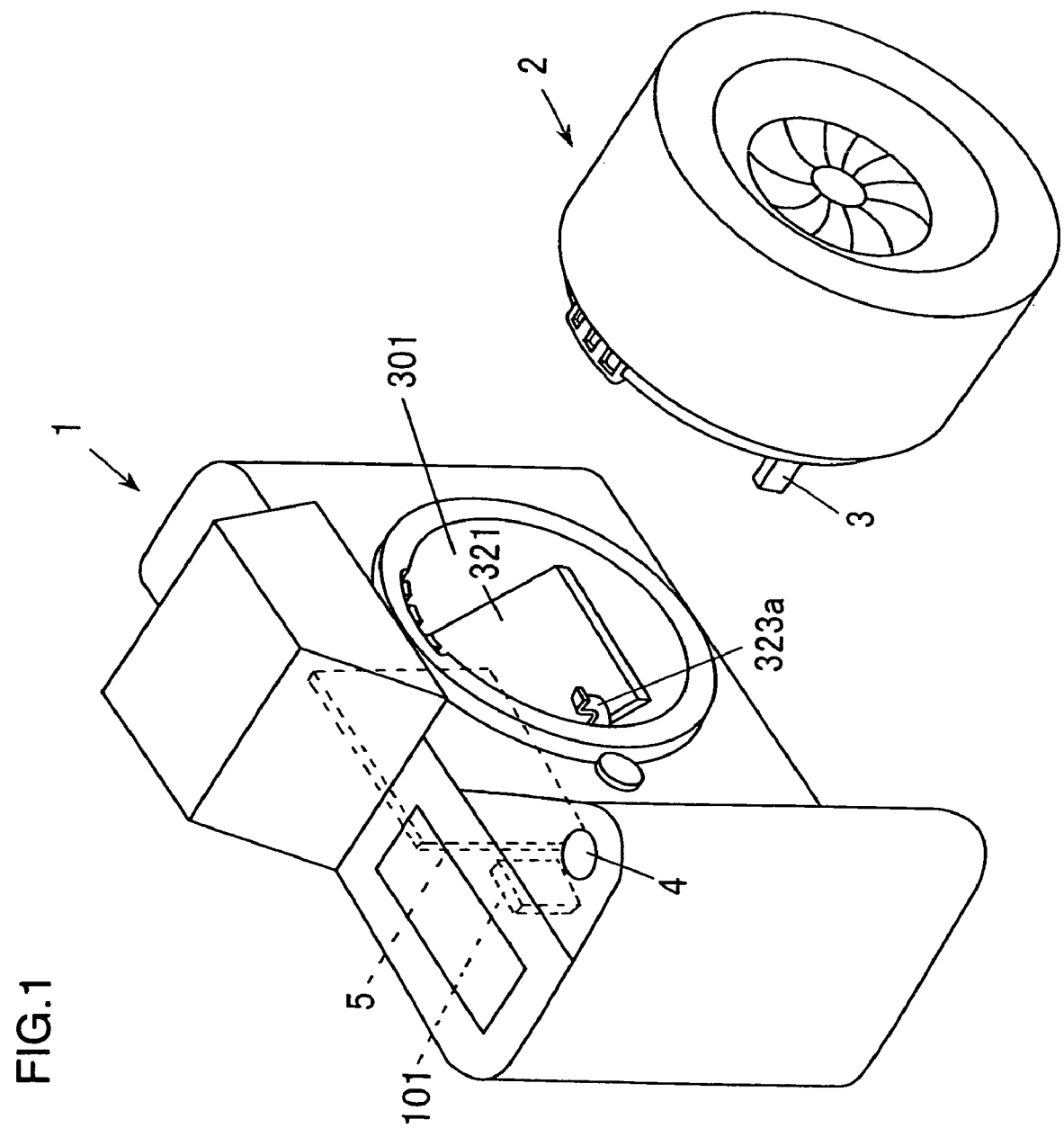
FIG. 1 is a perspective of the electronic camera achieved in a first embodiment of the present invention.

In reference to FIGS. 1 through 9, an electronic camera achieved in the first embodiment of the present invention is explained. FIG. 1 is a perspective of a single-lens reflex type camera body 1 of the electronic camera achieved in the first embodiment of the present invention and a photographic lens 2, which is mounted at the camera body 1. A shutter release button 4, a CCD 5 constituting an image-capturing element and a control circuit 101 that controls various parts of the camera are disposed at the camera body 1. Reference numeral 301 indicates a photographic optical path through which a subject image obtained through the photographic lens 2 is guided to the CCD 5.

In the electronic camera achieved in the embodiment, the length of the exposure period is controlled through a so-called electronic shutter that controls the length of time over which electrical charges are stored at the CCD 5 based upon a control signal provided by the control circuit 101. As the photographic lens 2 is mounted at the camera body 1, a lens-side aperture lever 3 and a contact portion 323*a* of a camera-side aperture lever 323 comes in contact with each other. The lens side aperture lever 3 is driven by the camera-side aperture lever 323 so as to achieve a specific aperture value. It is to be noted that in the explanation of the embodiment, the forward side of the camera body 1 at which the photographic lens 2 is mounted is referred to as the front side and the back side of the camera body 1 at which the CCD 5 is disposed is referred to as the rear side.

Mirror Box 300

Figure 2:
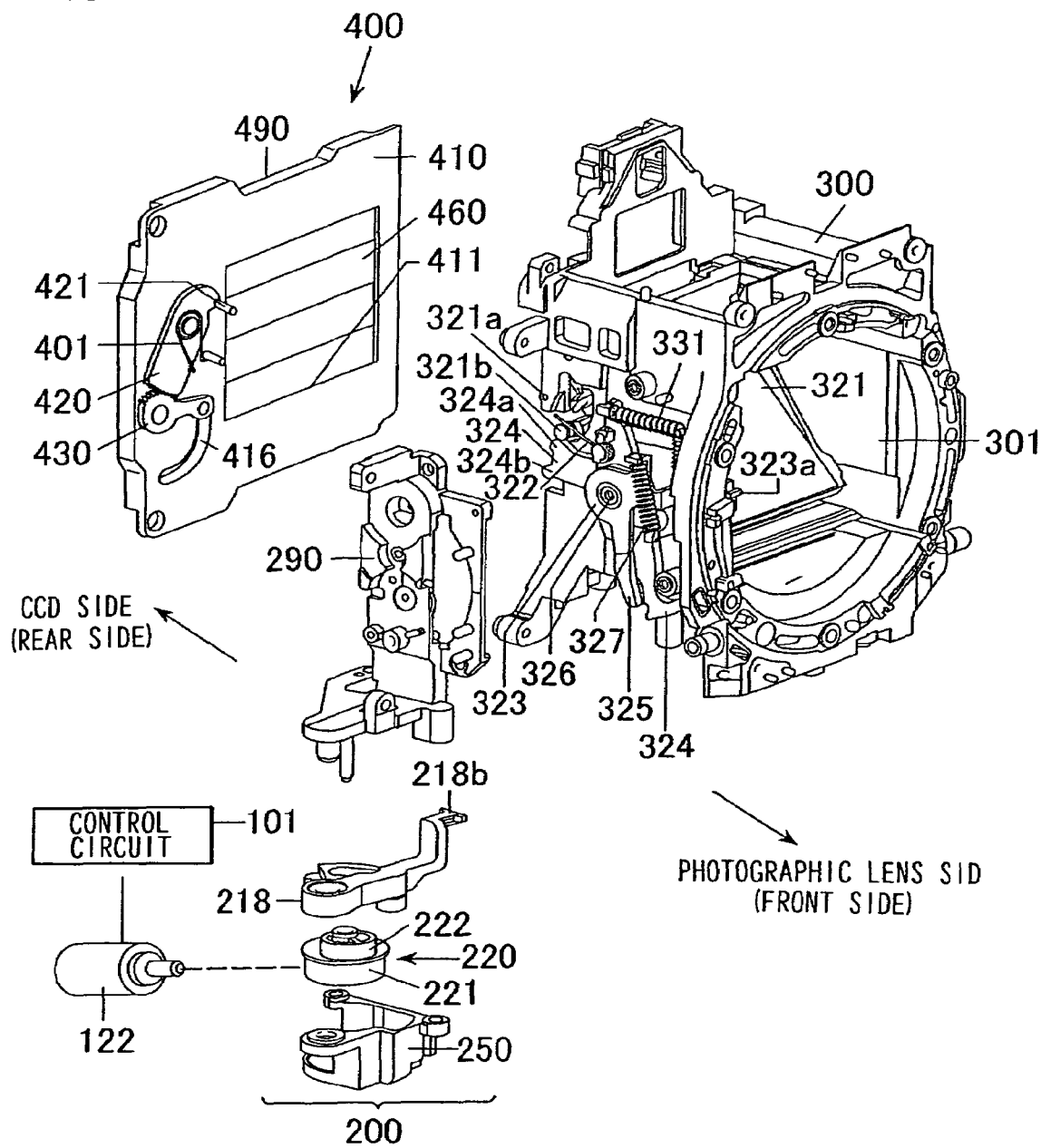
FIG. 2 is a perspective showing a mirror box, an aperture mechanism and a shutter mechanism.
Figure 3:
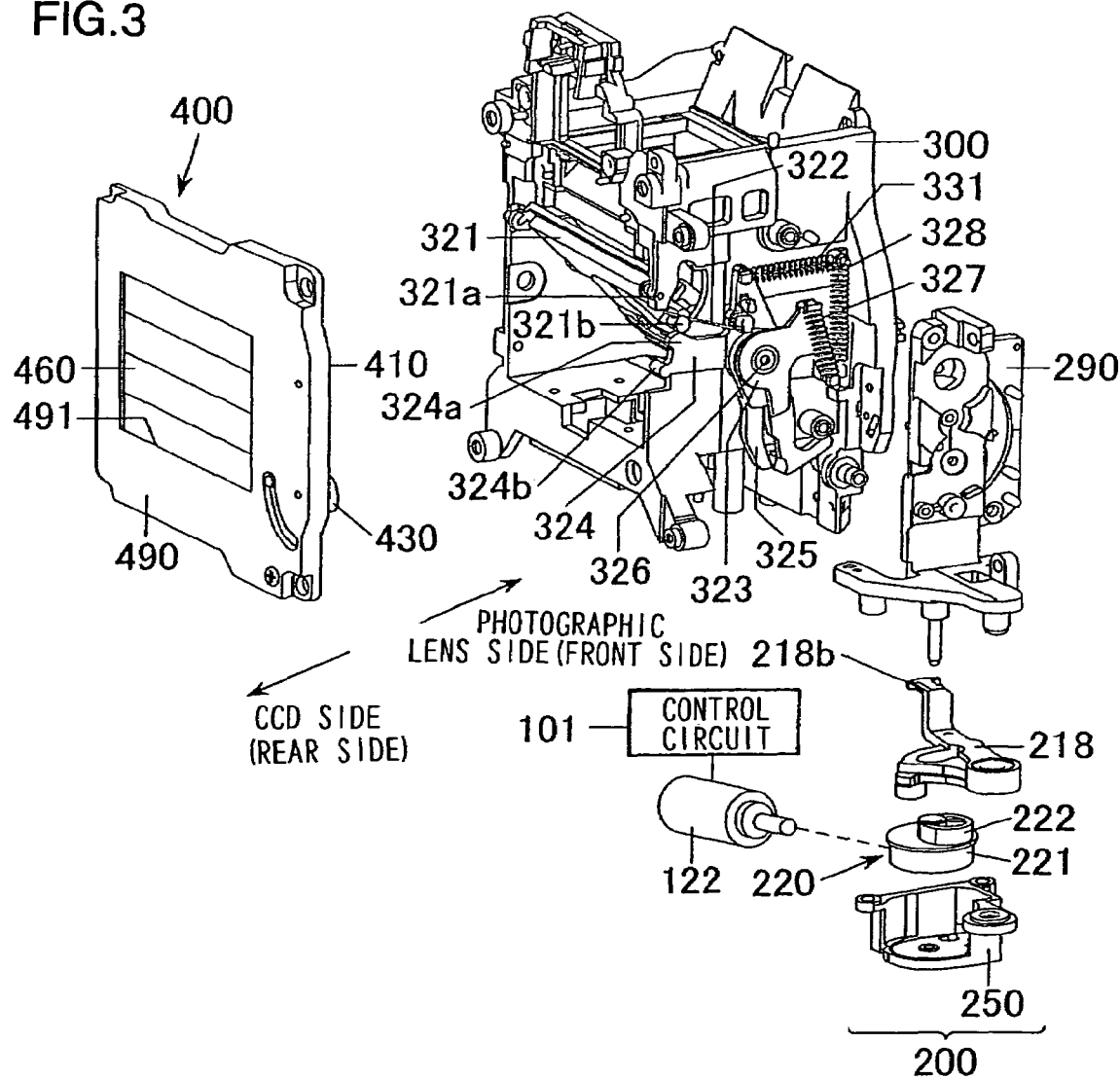
FIG. 3 is another perspective showing the mirror box, the aperture mechanism and the shutter mechanism.
Figure 4A:
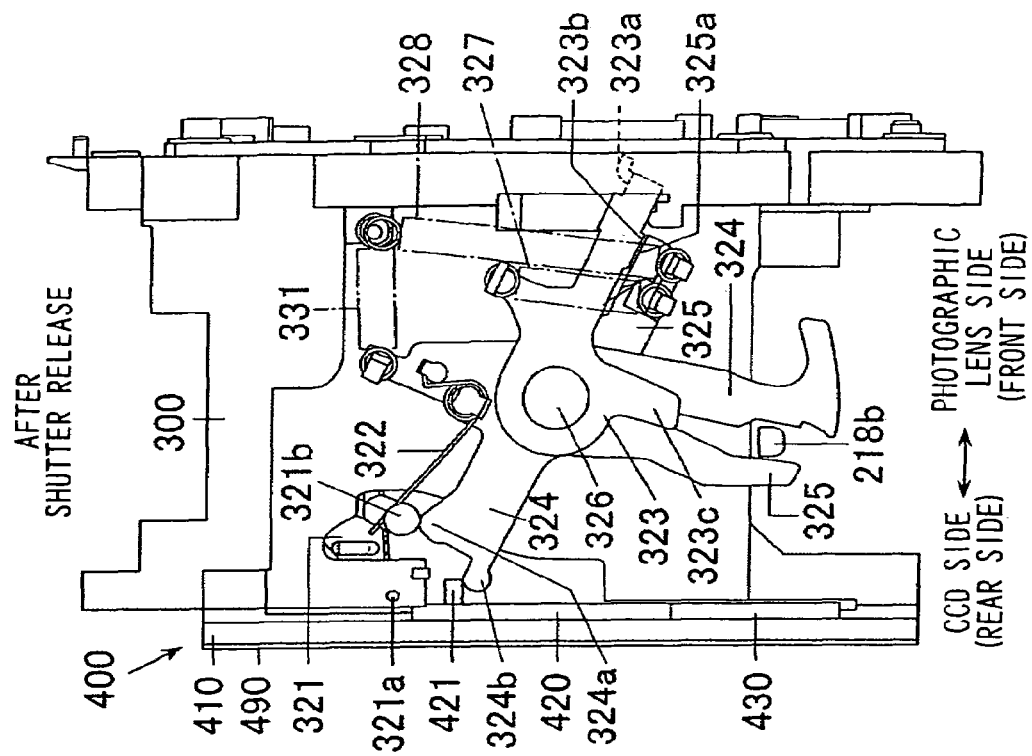
FIG. 4A is a side view of the mirror box and the shutter mechanism prior to a photographing operation start and FIG. 4B is a side view of the mirror box and the shutter mechanism after a shutter release.
Figure 4B:
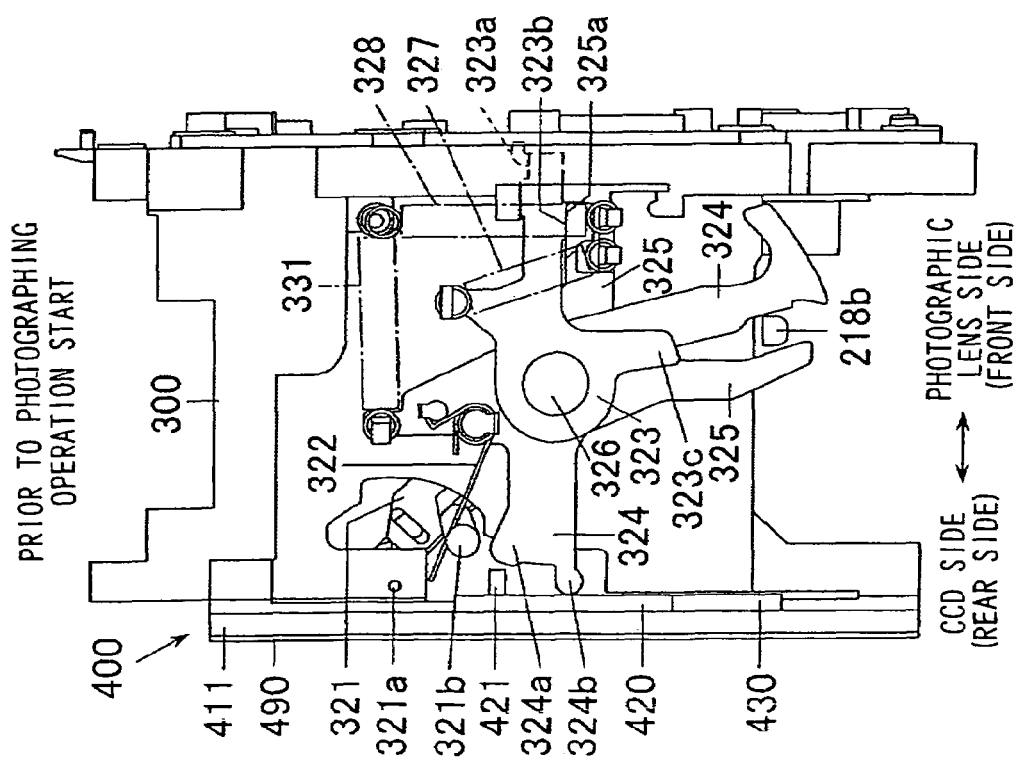

FIGS. 2 and 3 are perspectives showing a mirror box, an aperture mechanism and a shutter mechanism built into the camera body 1. In addition, FIGS. 4A and 4B provide side views of the mirror box and the shutter mechanism, with FIG. 4A showing a state prior to a photographing operation start and FIG. 4B showing a state after the shutter release. Inside the mirror box 300, a main mirror 321 is disposed (see FIGS. 2 and 3). A shaft 326 is disposed at a side surface of the mirror box 300 and an aperture interlock lever 323, a mirror-up lever 324 and an aperture drive lever 325 are rotatably mounted at the shaft 326. In addition, an aperture control mechanism 200 and a shutter mechanism 400 to be detailed later are mounted at the mirror box 300.

The main mirror 321 is driven between two positions, i.e., a down position assumed in the photographic optical path 301 to guide the subject image to a viewfinder (not shown) and an up position assumed outside the photographic optical path 301 to allow the subject image to pass to the CCD 5. The main mirror 321 is rotatably supported at the mirror box 300 via a mirror spindle 321*a* and as a force is applied to the main mirror 321 by a mirror-down spring 322 along the clockwise direction in the figures, it becomes held at a mirror receptacle (not shown) at an approximately 45° tilt (mirror-down position) As the mirror-up lever 324 to be detailed later drives a mirror drive pin 321*b* formed as an integrated part of the main mirror 321, the main mirror 321 is caused to swing upward along a counterclockwise direction from the mirror-down position to assume the mirror-up position. The mirror down spring 322 having one end thereof held at the mirror-up lever 324 and the other end thereof held at the mirror drive pin 321*b* of the main mirror 321 applies a force to the main mirror 321 in the clockwise direction in the figures, as described earlier.

A spring 327 applies a force along the clockwise direction in the figures to the aperture interlock lever 323 which controls the aperture at the photographic lens 2 so as to achieve a specific aperture value by driving the aperture lever 3 at the photographic lens 2 mounted at the camera body 1 with its contact portion 323*a*. While the mirror is in a lowered state prior to the start of a photographing operation, a lever contact portion 323*b* of the aperture interlock lever 323 is in contact with a lever contact portion 325*a* of the aperture drive lever 325 to restrict movement of the aperture interlock lever 323 along the clockwise direction in the figures (turn to the right) and thus, it is held at an angular position at which the aperture at the photographic lens 2 is set in an open state. In addition, a lever contact portion 323*c* is in contact with a transmission lever of the aperture mechanism 200 to be detailed later to hold the aperture interlock lever 323 at an angular position at which the aperture at the photographic lens 2 achieves a specific aperture value under the aperture control implemented during a mirror-up operation.

The aperture drive lever 325, which drives the aperture interlock lever 323, is linked with the aperture interlock lever 323 via the spring 327 and is also linked with the mirror box 300 via a spring 328. As a front end portion 218*b* of a sequence drive lever 218 to be detailed later is driven to the left in FIG. 4A, the aperture drive lever 325 is caused to rotate along the clockwise direction in the figures by the front end portion 218*b* of the sequence drive lever 218 and thus, the aperture interlock lever 323 is driven along the aperture closing direction (along the clockwise direction in the figures) via the spring 327. In addition, as the front end portion 218*b* of the sequence drive lever 218 is driven to the right in FIG. 4B, the aperture drive lever 325 is reset along the aperture opening direction (along the counterclockwise direction in the figure) by the spring 328 together with the aperture interlock lever 323 contacting the lever contact portion 325*a*.

The mirror-up lever 324 is used to drive an open/close lever 420 disposed at the shutter mechanism 400 to be detailed later as well as to raise and lower the main mirror 321 and includes a mirror drive end 324*a* and a shutter drive end 324*b*. A force is applied along the clockwise direction in the FIGS. by a mirror-up spring 331 to the mirror-up lever 324 and the position to which it rotates along the clockwise direction in the figures is regulated with the front end portion 218*b* of the sequence drive lever 218 to be detailed later. As the front end portion 218*b* of the sequence drive lever 218 is driven to the left in FIG. 4A, the mirror-up lever 324 is caused to rotate along the clockwise direction in the figure by the mirror-up spring 331 thereby driving the mirror drive pin 321*b* with its mirror drive end 324*a* to cause the main mirror 321 to rotate upward along the counterclockwise direction from the mirror-down position and also driving a shutter drive boss 421 at the switching lever 420 disposed at the shutter mechanism 400 with its shutter drive end 324*b* to open the shutter blades. As the front end portion 218*b* of the sequence drive lever 218 is driven to the right in FIG. 4B, the mirror-up lever 324 is caused to rotate along the counterclockwise direction in the figures by the front end portion 218*b* of the sequence drive lever 218 against the force applied from the mirror-up spring 331.

Aperture Control Mechanism 200

Figure 5:
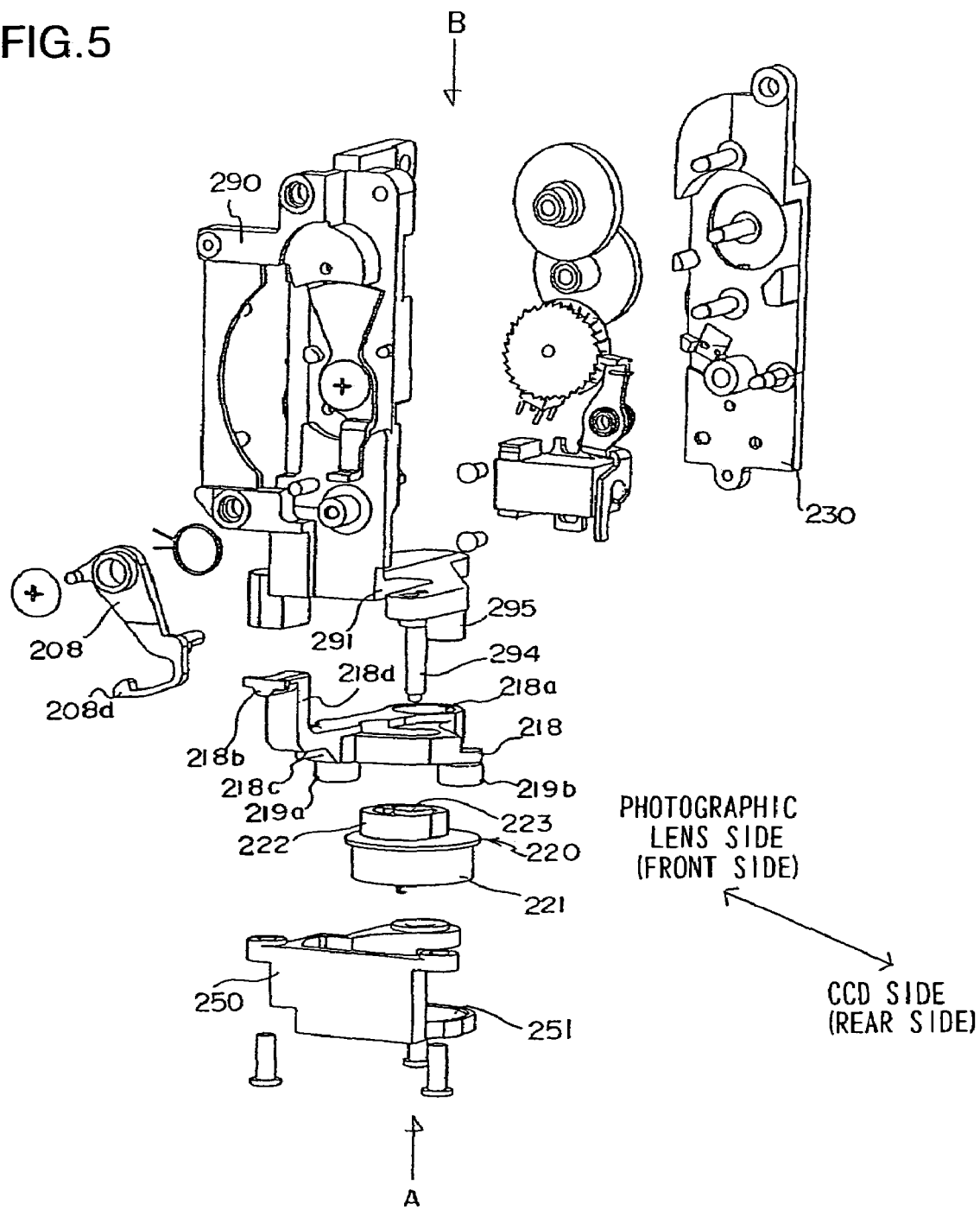
FIG. 5 is a perspective of the aperture mechanism.
Figure 6:
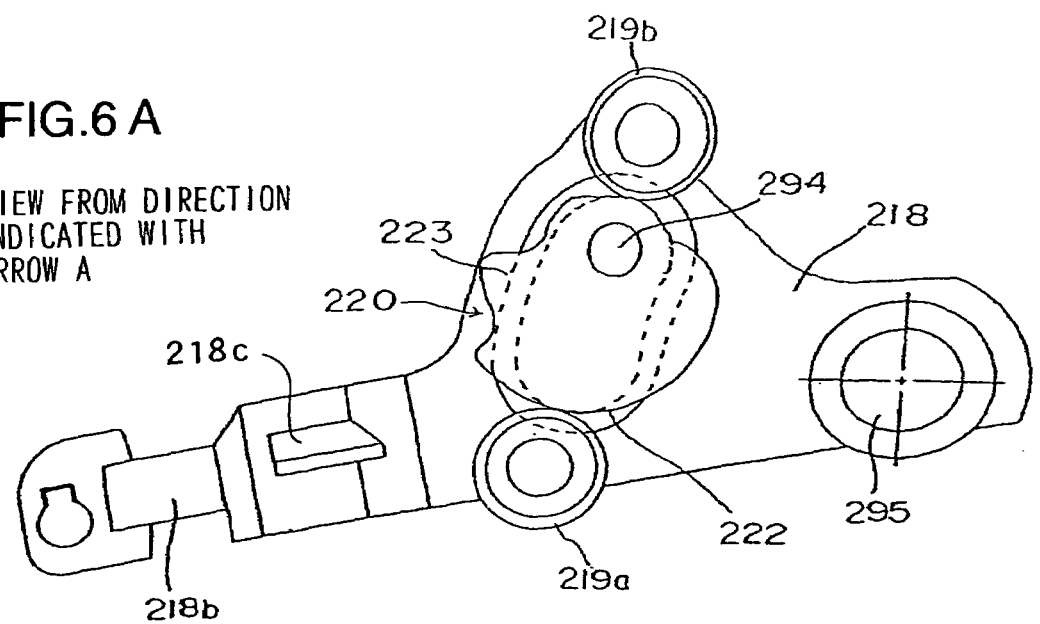
FIGS. 6A and 6B show the relationship between a sequence drive lever and a rotational phase of a cam prior to the photographing operation start with FIG. 6A showing the sequence drive lever viewed from the bottom side of the camera body (viewed from the direction indicated with the arrow A in FIG. 5) and FIG. 6B showing the sequence drive lever viewed from the top side of the camera body (viewed from the direction indicated with the arrow B in FIG. 5)
Figure 6:
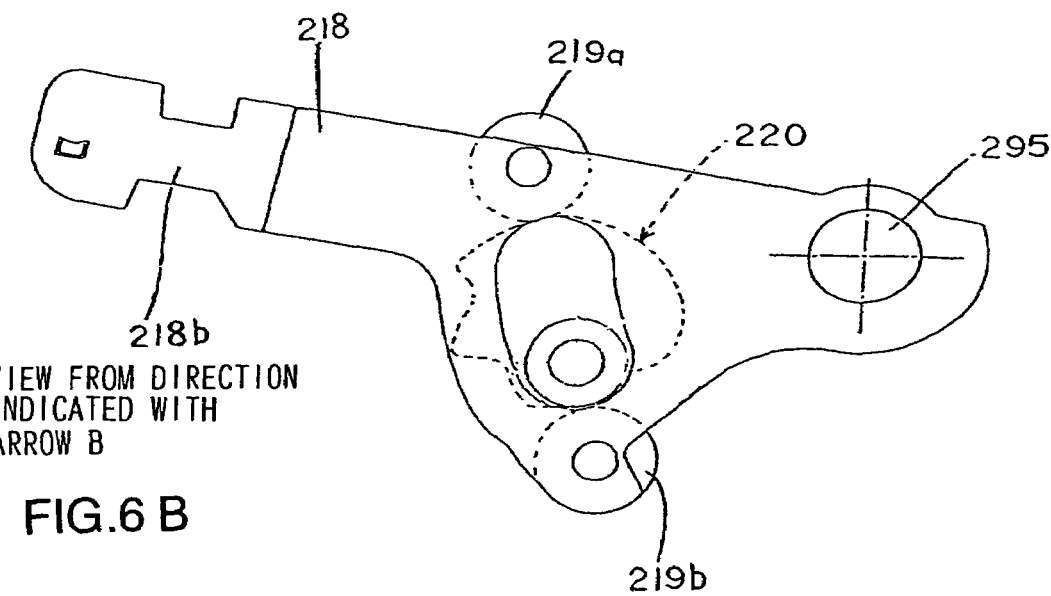

FIG. 5 is a perspective of the aperture mechanism 200. The aperture mechanism 200 is constituted with a control substrate 230 and a drive substrate 290 both having various parts disposed there at. At the control substrate 230, various parts used to control the aperture value are disposed. At the drive substrate 290, the control substrate 230 described above, various parts related to the aperture mechanism, a reset lever 208, the sequence drive lever 218, a cam 220 and a lid substrate 250 are mounted.

While a detailed explanation is not provided, the reset lever 208, axially supported so as to be allowed to rotate freely at a shaft disposed at the drive substrate 290, is driven by the sequence drive lever 218 to be detailed later to reset the aperture control mechanism 200.

Figure 7A:
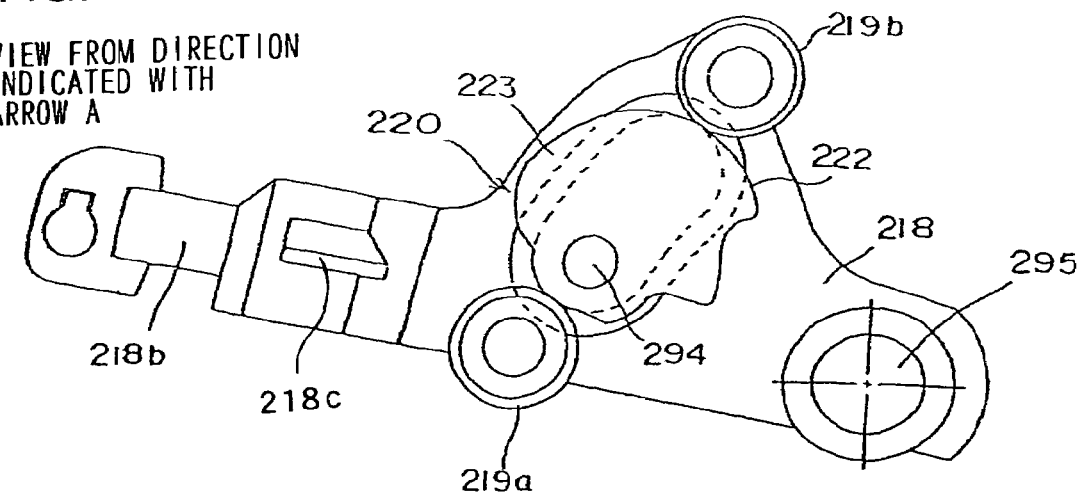
FIGS. 7A and 7B show the relationship between the sequence drive lever and the rotational phase of the cam after the shutter release with FIG. 7A showing the sequence drive lever viewed from the bottom side of the camera body 1 (viewed from the direction indicated with the arrow A in FIG. 5) and FIG. 7B showing the sequence drive lever viewed from the top side of the camera body (viewed from the direction indicated with the arrow B in FIG. 5)
Figure 7B:
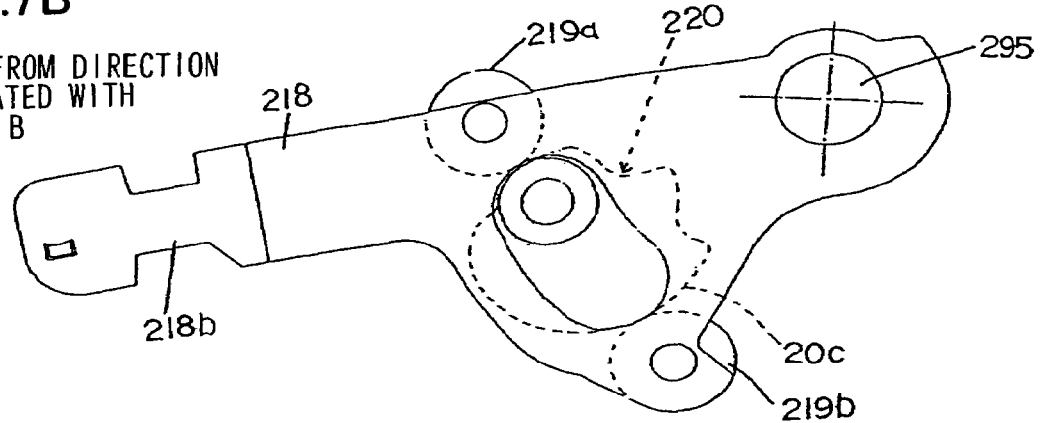

The sequence drive lever 218 is axially supported so as to be allowed to rotate relative to a shaft 295 disposed on the lower end side of the drive substrate 290. FIGS. 6A and 6B show the relationship between the sequence drive lever 218 and the rotational phase of the cam 220 prior to the photographing operation start. In addition, FIGS. 7A and 7B show the relationship between the sequence drive lever 218 and the rotational phase of the cam 220 following the shutter release. FIGS. 6A and 7A each show the sequence drive lever 218 viewed from the bottom side of the camera body 1 (from the direction indicated with the arrow A in FIG. 5), whereas FIGS. 6B and 7B each show the sequence drive lever 218 viewed from the top side of the camera body 1 (from the direction indicated with the arrow B in FIG. 5).

Two rollers 219a and 219b are disposed at the sequence drive lever 218. As the cam 220 rotates and a pressure is applied to the rollers 219a and 219b, the sequence drive lever 218 turns around the shaft 295. An arm 218d (see FIG. 5) is disposed at the sequence drive lever 218 so as to rise upright toward the upper side of the drive substrate 290. Accordingly, a movement of the cam 220 is transmitted as a movement of the sequence drive lever 218 to the mirror-up lever 324 and the aperture drive lever 325 from the front end portion 218b at the arm 218d. In addition, a projection 218c is formed at the sequence drive lever 218. As this projection 218c engages with a projected portion 208d at the reset lever 208 mentioned earlier, the reset lever 208 is caused to rotate to reset the aperture control mechanism 200.

The cam 220 is axially supported at a shaft 294 at the drive substrate 290 so as to be allowed to rotate and the lid substrate 250 holds the cam 220 to prevent it from slipping. The cam 220 is formed as an integrated unit that includes a gear portion 221 that interlocks with a gear (not shown) and a cam portion 223 constituting a cam surface 222 (see FIG. 5). The rotation of a drive motor 122 is transmitted to the cam 220 via the gear (not shown) (see FIGS. 2 and 3). It is to be noted that the drive motor 122 is controlled by the control circuit 101.

Shutter Mechanism 400

Figure 9A:
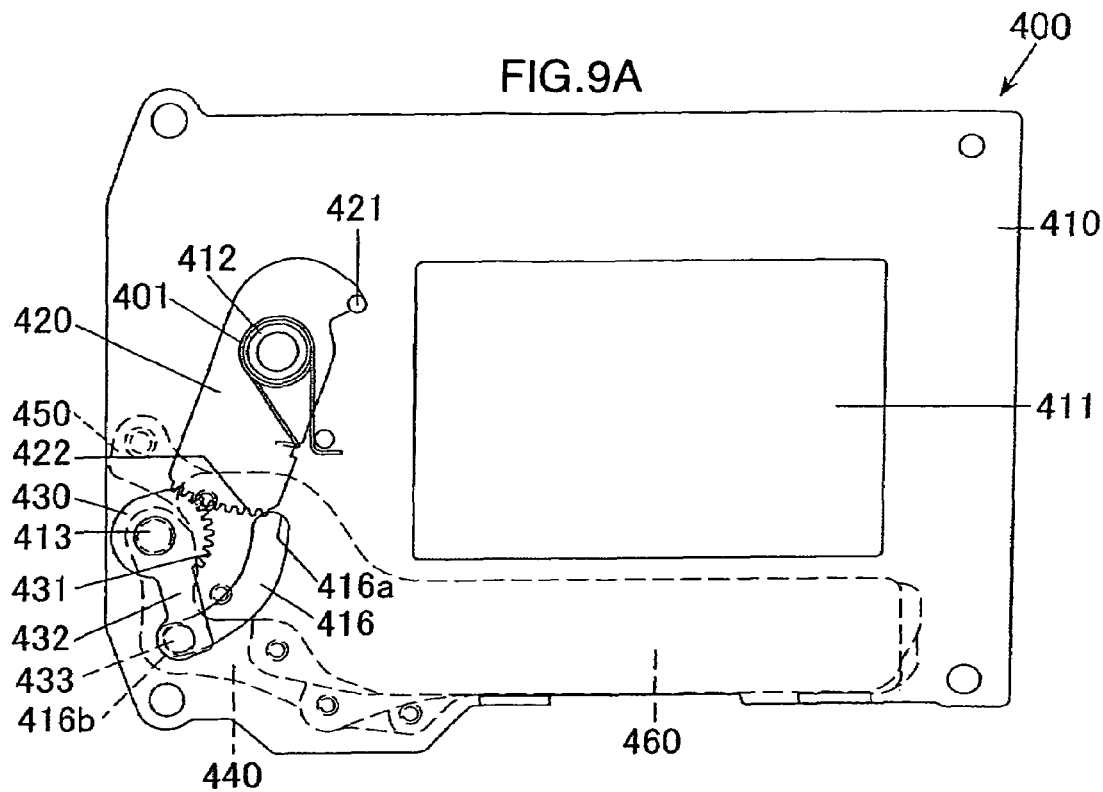
FIG. 9A is a front view of the shutter mechanism with the opening unshielded and FIG. 9B is a rear view of the inside of the shutter mechanism with the shutter cover plate removed.

FIGS. 8A and 8B and FIGS. 9A and 9B show the shutter mechanism 400. The shutter mechanism 400 includes a set of shutter blades that engage in opening/closing operations to switch to a closed state (see FIGS. 8A and 8B) in which the CCD 5 is shielded from light or an open state (see FIGS. 9A and 9B) in which the subject image is guided to the CCD 5. FIGS. 8A and 9A each show the shutter mechanism 400 viewed from the front, whereas FIGS. 8B and 9B each show the inside of the shutter mechanism 400 viewed from the rear with a shutter cover plate 490 to be detailed later removed. The shutter mechanism 400 is mounted at the rear side of the mirror box 300.

The shutter mechanism 400 includes a base plate 410, the switching lever 420, a blade drive lever 430, a blade main arm 440, a blade slave arm 450, shutter blades 460 and the shutter cover plate 490. The base plate 410 is a substrate at which the various parts constituting the shutter mechanism 400 are disposed and an opening 411 through which the subject image is guided to the CCD 5 is formed at the base plate 410. At the surface of the base plate 410 on the front side, a switching lever rotating shaft 412 and a blade drive lever rotating shaft 413 are disposed. At the surface of the base plate 410 on the rear side, a blade main arm rotating shaft 414 and a blade slave arm rotating shaft 415 are disposed. At the rear side of the base plate 410, the shutter cover plate 490 having an opening 491 ranging over an area equal to the range of the opening 411 at the base plate 410 is mounted (see FIG. 3).

The switching lever 420 is axially supported at the switching lever rotating shaft 412 and a force is applied to the switching lever 420 along the clockwise direction in FIGS. 8A and 9A by a switching lever reset spring 401. At the front side of the switching lever 420 at one end thereof, the shutter drive boss 421 is disposed so as to rise upright. At the other end of the switching lever 420, a gear portion 422 having a gear cut therein is disposed. The gear portion 422 interlocks with a gear portion present at the blade drive lever 430 to be detailed later.

The length and the position of the shutter drive boss 421 are set so as to ensure that when the shutter mechanism 400 is mounted at the mirror box 300, the shutter drive boss comes in contact with the shutter drive end 324b of the rotated mirror-up lever 324. As the shutter drive boss 421 is pressed upward by the shutter drive end 324b of the rotated mirror-up lever 324, the switching lever 420 is caused to rotate along the counterclockwise direction in FIGS. 8A and 9A against the force applied from the switching lever reset spring 401.

The blade drive lever 430, axially supported at the blade drive lever rotating shaft 413, includes a gear portion 431 having a gear cut therein, an arm 432 extending from the rotational center (the blade drive lever rotating shaft 413) toward the outside along the radial direction and a blade drive pin 433 disposed at the rear side of the arm 432. As explained earlier, the gear portion 431 at the blade drive lever 430 interlocks with the gear portion 422 at the switching lever 420 and, as a result, the switching lever 420 and the blade drive lever 430 rotate by interlocking with each other. The front end of the blade drive pin 433 passes through a longitudinal hole 416 formed in the shape of a circular arc at the base plate 410 and fits in a fitting hole 441 at the blade main arm 440 to be detailed later. Since the blade drive pin 433 passes through the longitudinal hole 416, the ranges of rotation of the blade drive lever 430 and the switching lever 420 are regulated in correspondence to the length of the circular arc of the longitudinal hole 416 that regulates the range over which the blade drive pin 433 is allowed to move.

At the rear side of the base plate 410, the blade main arm 440 axially supported at the blade main arm rotating shaft 414, the blade slave arm 450 axially supported at the blade slave arm rotating shaft 415 and four shutter blades 460 that are driven in an interlocked state by the blade main arm 440 and the blade slave arm 450 are disposed. Namely, the four shutter blades 460 are driven in an interlocked state with an arm mechanism of the known art constituted with the blade main arm 440 and the blade slave arm 450, so as to shield or unshield the opening 411 at the base plate 410 and the opening 491 at the shutter cover plate 490. As the blade drive pin 433 fitted at the fitting hole 441 which is formed in the blade main arm 440 is driven along the inside of the longitudinal hole 416, the blade main arm 440 is caused to turn around the blade main arm rotating shaft 414.

As the blade drive pin 433 fitted in the fitting hole 441 is driven upward along the inside of the longitudinal hole 416, the arms 440 and 450 are caused to rotate to the left in FIG. 8A (to the right in FIG. 8B), thereby pulling the shutter blades 460 upward to shield the openings 411 and 491. As the blade drive pin 433 fitted in the fitting hole 441 is driven downward along the inside of the longitudinal hole 416, the arms 440 and 450 are caused to rotate to the right in FIG. 8A (to the left in FIG. 8B), thereby pulling the shutter blades 460 downward to unshield the openings 411 and 491.

Since the switching lever reset spring 401 applies a force to the switching lever 420 in the clockwise direction in FIGS. 8A and 9A, a force is applied in the counterclockwise direction in FIGS. 8A and 9A to the blade drive lever 430 interlocking with the switching lever 420. Thus, the force applied from the switching lever reset spring 401 drives the blade drive pin 433 upward along the inside of the longitudinal hole 416. As a result, the shutter blades 460 are pulled upward, thereby shielding the openings 411 and 491. It is to be noted that the upward movement of the blade drive pin 433 is regulated as the blade drive pin 433 comes in contact with an upper end portion 416a of the longitudinal hole 416, as shown in FIGS. 8A and 8B. As the blade drive pin 433 comes into contact with the upper end portion 416a, the shutter blades 460 shield the openings 411 and 491 (see FIGS. 8A and 8B).

Figure 9B:
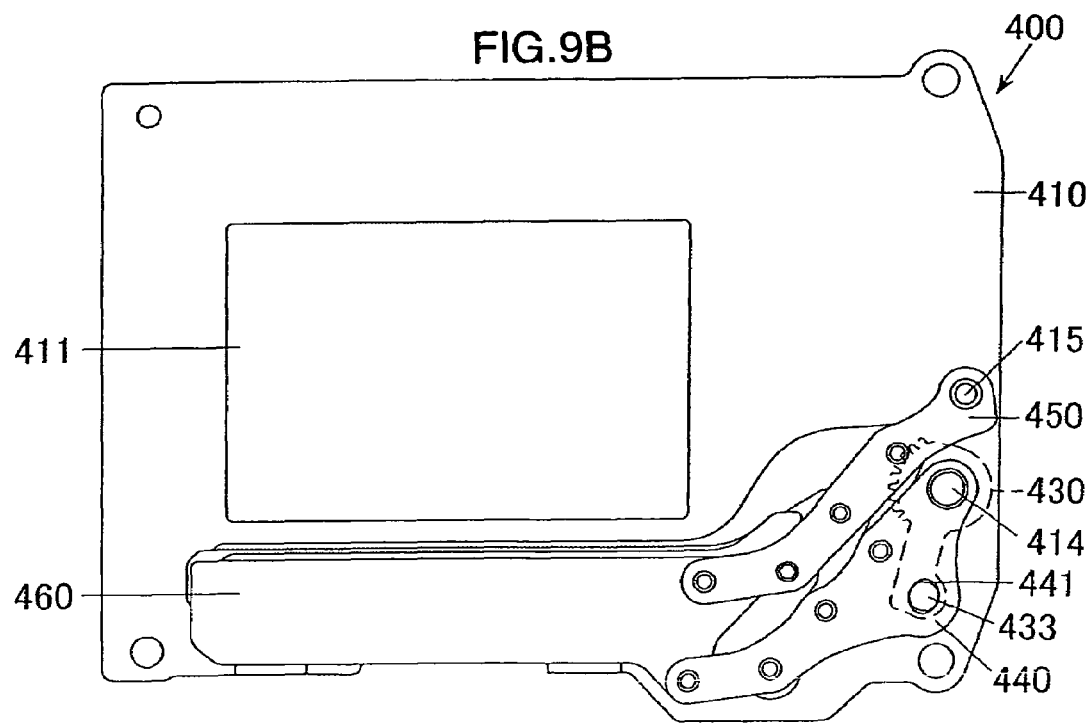

As the shutter drive boss 421 is pressed by the shutter drive end 324b of the rotated mirror-up lever 324 and the switching lever 420 is caused to rotate along the counterclockwise direction in FIGS. 8A and 9A against the force applied from the open/close lever reset spring 401, the blade drive lever 430 interlocking with the switching lever 420 is caused to rotate along the clockwise direction in FIGS. 8A and 9A. Thus, the blade drive pin 433 is driven downward along the inside of the longitudinal hole 416, thereby causing the arms 440 and 450 to rotate to the right in FIG. 8A (to the left in FIG. 8B) and pulling the shutter blades 460 downward. It is to be noted that while the blade drive pin 433 is allowed to move inside the longitudinal hole 416 until it comes in contact with a lower end portion 416b of the longitudinal hole 416, the four shutter blades 460 are all pulled further downward relative to the lower ends of the openings 411 and 491 immediately before the blade drive pin 433 comes in contact with the lower end portion 416b to unshield the openings 411 and 491 as shown in FIGS. 9A and 9B.

Namely, the shutter mechanism 400 achieved in the embodiment engages in operation as described below as the mirror-up lever 324 is rotated. It is to be noted that a separate explanation is to be provided later on how the angular position of the mirror-up lever 324 changes.

(1) If the mirror-up lever 324 assumes an angular position at which the shutter drive end 324b does not press against the shutter drive boss 421, the levers 420 and 430 are caused to rotate by the force applied from the switching lever reset spring 401 and the shutter blades 460 shield the openings 411 and 491 at the shutter mechanism 400 (see FIGS. 8A and 8B).

(2) As the mirror-up lever 324 rotates to press the shutter drive boss 421 upward with the shutter drive end 324b, the switching lever 421 is caused to rotate against the force applied from the switching lever reset spring 401 and, as a result, the shutter blades 460 are pulled down at the shutter mechanism 400.

(3) As the shutter drive end 324b further applies pressure to the shutter drive boss 421, the shutter blades 460 are pulled further downward relative to the lower ends of the openings 411 and 491, thereby unshielding the openings 411 and 491 at the shutter mechanism 400, as shown in FIGS. 9A and 9B.

Since the individual levers 420 and 430 and the individual arms 440 and 450 are disposed so as to assume the angular positions shown in FIGS. 8A and 8B and FIGS. 9A and 9B, the shutter drive boss 421 is allowed to move along a substantially vertical direction within a specific angle range around the switching lever rotating shaft 412 at the shutter mechanism 400 achieved in the embodiment. It is to be noted that as described above, the angle range over which the shutter drive boss 421 is allowed to move is regulated in correspondence to the length of the circular arc of the longitudinal hole 416 that regulates the range over which the blade drive pin 433 is allowed to move.

At the shutter mechanism adopting the structure described above, the shutter blades 460 engage in opening/closing operations by conforming to the substantially vertical movement of the shutter drive boss 421 at the switching lever 420. In other words, the shutter mechanism adopts a structure in which the drive force imparted from the shutter drive end 324b of the mirror-up lever 324 is directly transmitted to the shutter blades 460.

At the shutter mechanism 400, the shutter blades 460 are switched to the open position or the closed position by amplifying the extent to which the shutter drive end 324b of the mirror-up lever 324 presses against the shutter drive boss 421 at the switching lever 420 to drive the shutter drive boss 421. Namely, the distance from the gear portion 422 of the switching lever 420 to the switching lever rotating shaft 412 constituting the rotational center is set greater than the distance from the shutter drive boss 421 to the switching lever rotating shaft 412, whereas the distance from the blade drive pin 433 to the blade drive lever rotating shaft 413 constituting the rotational center is set greater than the distance from the gear portion 431 of the blade drive lever 430 to the blade drive lever rotating shaft 413. Thus, the blade drive pin 433 can be moved by a great extent along the inside of the longitudinal hole 416 even though the shutter drive end 324b drives the shutter drive boss only by a small extent.

Photographing Operation

An explanation is now given on the operations of the individual parts executed while photographing an image with the electronic camera achieved in the first embodiment. FIG. 6A shows the state of the sequence drive lever 218 and the cam 220 before the photographing operation starts. With the cam surface 222 pressing against the roller 219a, the sequence drive lever 218 is first driven to rotate to the left and then is held in place. As shown in the side view of the camera body 1 in FIG. 4A, the front end portion 218b of the sequence drive lever 218 is driven toward the front side of the camera body 1 and is then held in place.

The mirror-up lever 324 is caused to rotate to the left in FIG. 4A by the front end portion 218b against the force applied from the mirror-up spring 331. In this state, the mirror drive end 324a does not contact the mirror drive pin 321b at the main mirror 321 and the shutter drive end 324b does not contact the shutter drive boss 421 at the switching lever 420. Thus, the main mirror 321 assumes the mirror-down position and the shutter blades 460 shield the openings 411 and 491 (see FIGS. 8A and 8B).

The aperture drive lever 325 is caused by the spring 328 to rotate to the left in FIG. 4A together with the aperture interlock lever 323 which is in contact with its lever contact portion 325a. Thus, the lens aperture is in an open state before the photographing operation starts.

As a shutter release signal is input from the shutter release switch (not shown) in response to a depression of the shutter release button 4, the control circuit 101 drives the drive motor 122. As the drive motor 122 rotates, the cam 220 is caused to rotate to the left by approximately 180° to shift into the state shown in FIG. 7A from the state shown in FIG. 6A. After entering the state shown in FIG. 7A, the drive motor 122 stops. The cam surface 222 presses against the roller 219b to drive the sequence drive lever 218 so as to rotate it to the right.

The front end portion 218b of the sequence drive lever 218 moves from the front side to the rear side of the camera body 1 to shift from the state in FIG. 4A to the state shown in FIG. 4B and causes the aperture drive lever 325 to rotate to the right in FIG. 4A. As the aperture drive lever 325 is caused to rotate to the right, the force applied from the spring 327 causes the aperture interlock lever 323 to start rotating to reduce the lens aperture from the open state.

Once the front end portion 218b moves to the rear side, the mirror-up lever 324 is caused to rotate to the right in FIG. 4A by the force applied from the mirror-up spring 331. As the mirror-up lever 324 rotates to the right, the mirror drive end 324a first comes in contact with the mirror drive pin 321b of the main mirror 321, thereby rotating the main mirror 321 from the mirror-down position along the counterclockwise direction. As the mirror-up lever rotates further to the right, i.e., as the mirror up operation progresses, and the main mirror 321 rotates almost to the mirror-up position, the shutter drive end 324b comes into contact with the shutter drive boss 421 at the switching lever 420. As the mirror-up lever 324 rotates further to the right, the shutter drive end 324b presses the shutter drive boss 421 upward and thus, the shutter blades 460 are pulled downward as explained earlier.

When the mirror up operation is completed by rotating the mirror-up lever 324 to the right, as described above, i.e., in the post-shutter release state shown in FIG. 4B, the shutter blades 460 are pulled further downward relative to the lower ends of the openings 411 and 491 and thus, the openings 411 and 491 are unshielded, as shown in FIGS. 9A and 9B.

Following the shutter release operation described above, the electrical charge storage at the CCD 5 is controlled with the electronic shutter which is controlled by the control circuit 101 and thus, the image is captured. Since the drive motor 122 is in a stopped state while the electrical charge storage at the CCD 5 is in progress, the cam 220 and the sequence drive lever 218, too, are in a stopped state. For this reason, the mirror-up lever 324 having been rotated to the right by the force applied from the mirror-up spring 331 is held in place with its shutter drive end 324b pressing the shutter drive boss 421 upward. Once the electrical charge storage at the CCD 5 is completed and the image is captured, a reset operation is executed to reset the various parts. The following is an explanation of the reset operation.

During the reset operation, the drive motor 122 is driven again. As the drive motor 122 rotates, the cam 220 having been in the state shown in FIG. 7A is caused to rotate to the left by approximately 180° and thus recovers the state shown in FIG. 6A before it stops. With the cam surface 222 pressing against the roller 219a, the sequence drive lever 218 is driven to rotate to the left. At this time, the front end portion 218b moves from the rear side to the front side of the camera body 1 to switch from the state in FIG. 4B to the state in FIG. 4A and the mirror-up lever 324 is caused to rotate to the left in FIG. 4B.

As the mirror-up lever 324 is caused to rotate to the left, the main mirror 321 is caused to rotate to the right in FIG. 4B by the force applied from the other end of the mirror down spring 322 having one end thereof held at the mirror-up lever 324 and thus is reset to the mirror-down position. The shutter drive boss 421 having been pressed by the shutter drive end 324b of the mirror-up lever 324, i.e., the switching lever 420, is driven with the force applied from the switching lever reset spring 401 so as to shield the openings 411 and 491 with the shutter blades 460 by conforming to the leftward rotation of the mirror-up lever 324. As the mirror-up lever 324 rotates further to the left, the shutter blades 460 completely shield the openings 411 and 491, the switching lever 420 then stops and the shutter drive end 324b departs the shutter drive boss 421. As the mirror-up lever 324 rotates further to the left, the mirror down operation is completed, the main mirror 321 stops rotating to the right and the mirror drive end 324a departs the mirror drive pin 321b.

Once the reset operation ends, the force applied from the spring 328 resets both the aperture interlock lever 323 and the aperture drive lever 325 so as to rotate them to the left, thereby setting the lens aperture in the open state.

The following advantages are realized in the electronic camera achieved in the first embodiment described above.

(1) The shutter blades 460 are driven by driving the shutter drive boss 421 at the switching lever 420 with the shutter drive end 324b of the mirror-up lever 324 that communicates the mirror up drive force to the main mirror 321. Thus, the shutter blades 460 can be driven without having to use an actuator or a complicated drive mechanism for shutter drive to achieve a great reduction in the number of parts required to drive the shutter blades 460, which makes it possible to provide an electronic camera, a shutter mechanism and a mirror drive mechanism that effectively cut the production costs and allow efficient use of available space in a miniaturized unit.

(2) When raising the mirror, the shutter blades 460 are driven by pressing the shutter drive boss 421 at the switching lever 420 upward with the shutter drive end 324b of the mirror-up lever 324 against the force applied from the switching lever reset spring 401 and a charge force with which the shutter blades 460 are to be driven to the closed position is stored. While the electrical charges are being stored at the CCD 5, the mirror-up lever 324 stops with the shutter drive end 324b continuously pressing the shutter drive boss 421 upward so as to hold the charge force with which the shutter blades 460 are to be driven to the closed position. During the mirror down operation, the force (charge force) applied from the switching lever reset spring 401 causes the shutter drive end 324b to follow the leftward rotation of the mirror-up lever 324 so as to shield the openings 411 and 491 with the shutter blades 460. As a result, no special mechanism for holding the lever having been driven against the force applied from the spring is required and a shutter mechanism adopting a simple structure is achieved to lower the manufacturing costs and enable efficient use of available space in a miniaturized system.

(3) Since the structure allows the opening/closing operation of the shutter blades 460 to follow the substantially vertical movement of the shutter drive boss 421 disposed at the switching lever 420, the drive force imparted from the shutter drive end 324b of the mirror-up lever 324 is directly transmitted to the shutter blades 460. As a result, the shutter blades 460 can be driven through a simple movement of the shutter drive end 324b at the mirror-up lever 324 which allows the mirror-side mechanism that supplies the motive force for driving the shutter blades 460 to the shutter mechanism 400 to assume a simple structure. Since a mirror-side mechanism achieved by only slightly modifying the design of the mirror-side mechanism in the related art can be utilized, the development cost can be lowered.

(4) The shutter 460 is opened/closed by amplifying the extent by which the shutter drive boss 421 at the switching lever 420 is pressed and driven by the shutter drive end 324b of the mirror-up lever 324. As a result, it becomes possible to drive the shutter blades 460 with the mirror up drive force and thus, the design work can be simplified. In addition, since a member capable of providing a significant drive force does not need to be provided on the mirror side to which the drive force is supplied, the manufacturing costs can be reduced and effective use of limited space in a miniaturized system is facilitated.

(5) The mirror-up lever 324 is used to drive the main mirror 321 and also to engage the shutter blades 460 in an opening/closing operation. Since the mirror-side mechanism used in the related art can be utilized for these purposes, only a minimal modification is required in the parts design to achieve a high level of cost effectiveness.

(6) The shutter blades 460 start opening immediately before the mirror up operation ends and the shutter blades 460 start closing immediately after the start of the mirror down operation. Since this minimizes the length of time over which the CCD 5 is exposed to the subject light outside of the electrical charge storage period, the extent of degradation in the image quality caused by the smear phenomenon and the like can be effectively minimized to allow the subject image achieving a high image quality to be recorded.

Variations of First Embodiment (1) While the mirror-up lever 324 is driven with the force applied from the mirror-up spring 331 during the mirror up operation in the explanation provided above, the present invention is not limited to this example and the mirror up operation may be executed by using the drive force generated by the drive motor 122, instead. Namely, the mirror-up lever 324 may be driven with the front end portion 218b of the sequence drive lever 218 which rocks toward the front side and the rear side. In such a structure, the mirror up operation and the shutter opening operation are executed as the mirror-up lever 324 is pressed by the sequence drive lever 218 which is driven by the drive motor 122.

(2) While the shutter blades 460 are engaged in the opening operation by using the drive force with which the mirror-up lever 324 raises the main mirror 321 and the shutter blades 460 are engaged in a closing operation by using the force applied by the switching lever reset spring 401 in the explanation provided above, the present invention is not limited to this example. For instance, the shutter blades 460 may be engaged in a closing operation by using the drive force with which the main mirror 321 is lowered, the charge force used to engage the shutter blades 460 in an opening operation may be stored and the shutter blades 460 may be engaged in an opening operation by using the charge force, instead. An example of such an application is shown in FIGS. 10A and 10B. The main mirror 321 is raised by the force applied from a spring 522 along the mirror raising direction and is lowered by using a mirror drive end 524a of a mirror-down lever 524.

A force is applied to a shutter mechanism 600 from a spring (hereafter referred to as a shutter opening spring) equivalent to the switching lever reset spring 401 in the explanation above along the direction opposite from the direction in which the force is applied in the explanation provided above. Thus, an upward force is applied to the shutter drive boss 421 so as to engage the shutter blades 460 in the opening operation with the shutter opening spring. The shutter drive boss 421 and a shutter drive end 524b of the mirror-down lever 524 are linked with each other via an absorption mechanism 501 that absorbs any overcharge by the shutter drive end 524b at the mirror-down lever 524.

As shown in FIG. 10A, before the photographing operation starts, the front end portion 218b of the sequence drive lever 218 having moved toward the front side causes the mirror-down lever 524 to rotate to the left. In this state, the shutter drive end 524b drives the shutter drive boss 421 downward via the absorption mechanism 501, thus engaging the shutter blades 460 in the closing operation.

As shown in FIG. 10B, after the shutter release, the front end portion 218b of the sequence drive lever 218 moves toward the rear side and, as a result, the mirror-down lever 524 is caused to rotate to the right by the force applied from the spring 331. Thus, the main mirror 321 is raised with the force applied by a spring 522. As the shutter drive end 524b moves upward, the force applied from the shutter opening spring engages the shutter blades 460 in the opening operation.

(3) While the shutter blades 460 are engaged in either the opening operation or the closing operation by using the drive source that drives the main mirror 321 in the explanation provided above, the present invention is not limited to this example, and the shutter blades 460 may instead be engaged in opening/closing operations by using the drive source that drives the main mirror 321. For instance, in conjunction with a shutter mechanism 400 that does not include the switching lever reset spring 401, the shutter drive boss 421 may be pressed upward with the shutter drive end 324b of the mirror-up lever 324 as in the electronic camera in the embodiment to raise the mirror. To lower the mirror, the shutter drive end 324b may be used to press the shutter drive boss 421 downward via an absorption mechanism for absorbing any over charge occurring during the mirror down operation (e.g., the absorption mechanism 501 mentioned earlier). An example of such an application is shown in FIGS. 11A and 11B.

A spring 333 that presses the shutter drive boss 421 downward as the mirror-up lever 324 rotates to the left is disposed at the mirror-up lever 324. One end of the spring 333 is locked to the mirror-up lever 324 whereas the range over which the other end of the spring is allowed to move is regulated with a pin 324c disposed at the mirror-up lever 324. It is to be noted that the front tip of the other end of the spring 333 is bent further inward on the drawing sheet surface so as to press the shutter drive boss 421 downward. In the variation shown in FIGS. 11A and 11B, no switching lever reset spring 401 is included in the shutter mechanism 400, as explained above, and thus, the shutter blades 460 are driven for the opening/closing operations with an external force applied to the shutter drive boss 421, as explained below.

Prior to the start of the photographing operation, the shutter drive boss 421 is pressed downward by the spring 333 and the openings 411 and 491 are shielded by the shutter blades 460, as shown in FIG. 11A. The opening operation of the shutter blades 460 is achieved with the shutter drive boss 421 pressed upward with the shutter drive end 324b as in the embodiment described above during the mirror up operation (see FIG. 11B).

As the reset operation starts and the mirror-up lever 324 is driven with the front end portion 218b of the sequence drive lever 218, the other end of the spring 333 comes into contact with the shutter drive boss 421 immediately after the mirror-up lever 324 starts to rotate to the left and thus downward drive of the shutter drive boss 421 starts. The closing operation of the shutter blades 460 ends while the mirror-up lever 324 is still rotating to the left, thereby stopping the descent of the shutter drive boss 421. The extent of the rotational drive (overcharge) attributable to the further leftward rotation of the mirror-up lever 324 is absorbed through the flexure of the spring 333.

(4) While the mirror-up lever 324 is used to raise the main mirror 321 and also open the shutter blades 460 in the explanation provided above, the present invention is not limited to this example. For instance, the force applied from the mirror-up spring 331 may be transmitted to the shutter drive boss 421 at the switching lever 420 by using a member other than the mirror-up lever 324.

(5) While the shutter drive boss 421 is driven with the mirror-up lever 324 or the mirror-down lever 524 in the explanation provided above, the present invention is not limited to this example. For instance, the shutter drive boss 421 may instead be driven with a member disposed at the main mirror 321, which operates by interlocking with the main mirror 321.

(6) The specific features of the embodiment and the individual variations may be adopted in combination.

The first embodiment and the variations thereof described above make it possible to drive the shutter blades without having to use an actuator or a complex drive mechanism for shutter drive, which allows the number of parts required for shutter blade drive to be greatly reduced and realizes an electronic camera, a shutter mechanism and a mirror drive mechanism achieving a reduction in the manufacturing costs and facilitates efficient use of limited space available in a miniaturized system.

Second Embodiment

The electronic camera achieved in the second embodiment of the present invention is explained below. The overall structure of the electronic camera achieved in the second embodiment is similar to that of the electronic camera achieved in the first embodiment shown in FIG. 1.

Mirror Box 300

Figure 12:
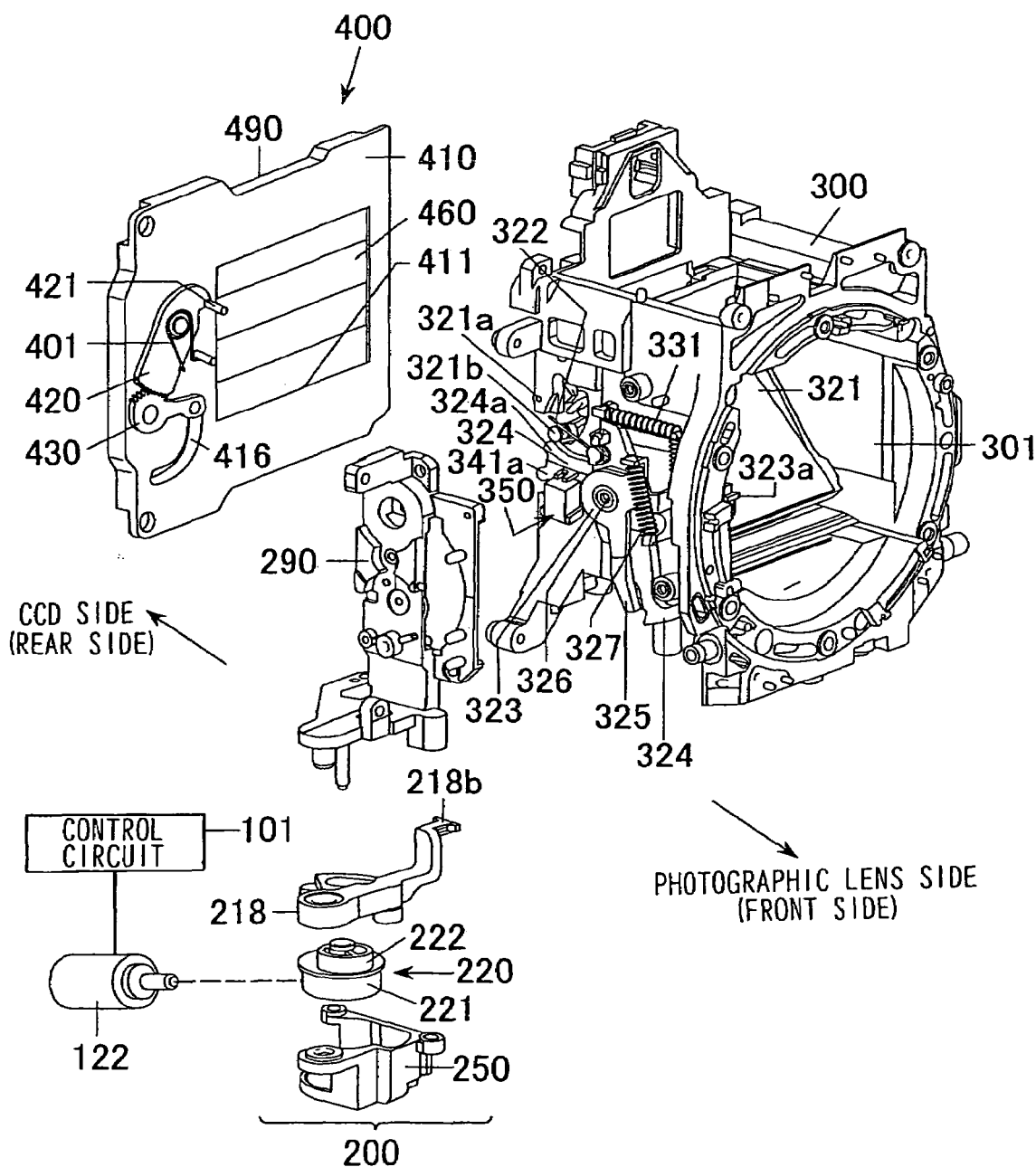
FIG. 12 is a perspective of a mirror box, an aperture mechanism and a shutter mechanism achieved in a second embodiment.
Figure 13:
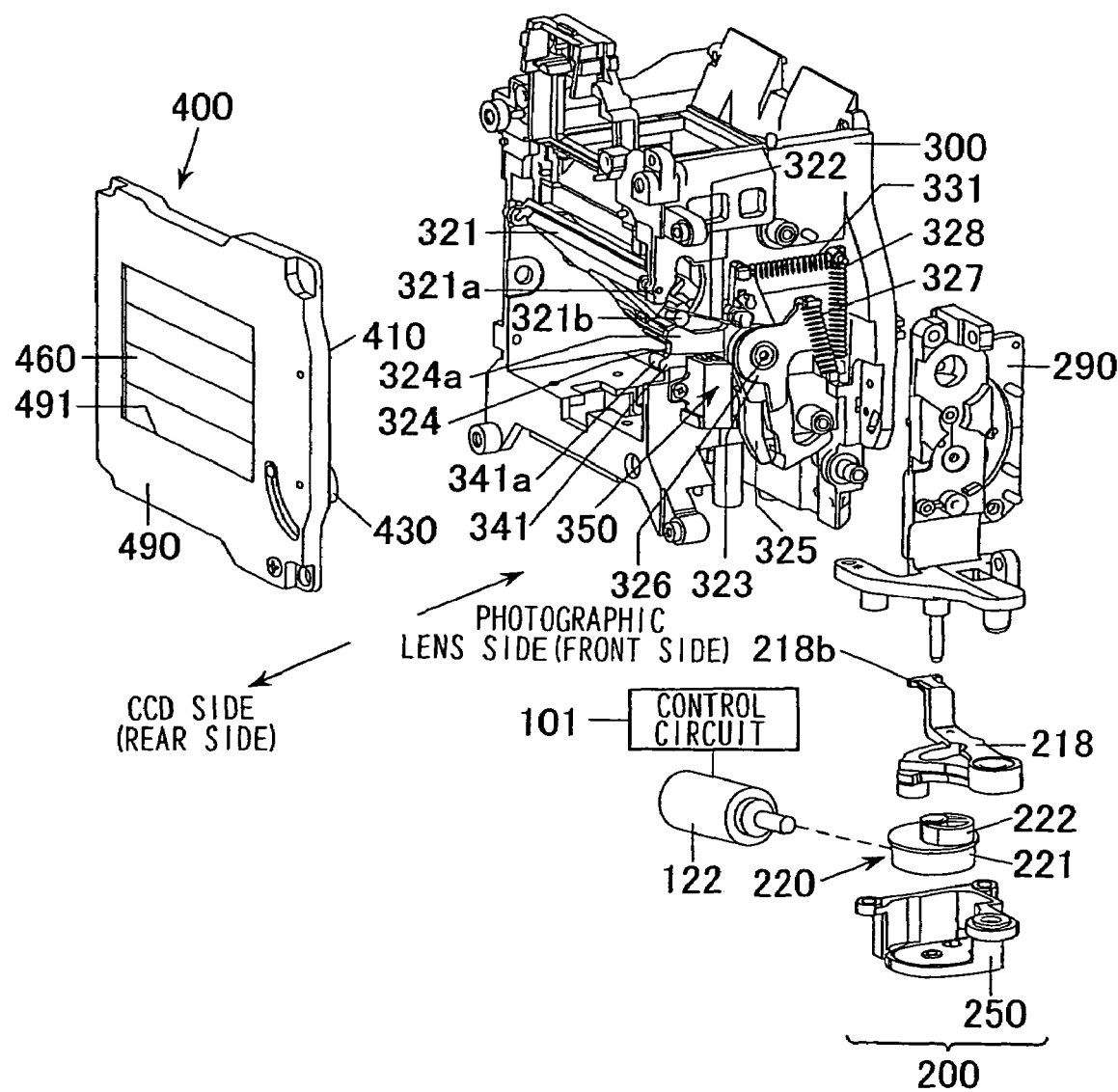
FIG. 13 is another perspective of the mirror box, the aperture mechanism and the shutter mechanism.
Figure 14:
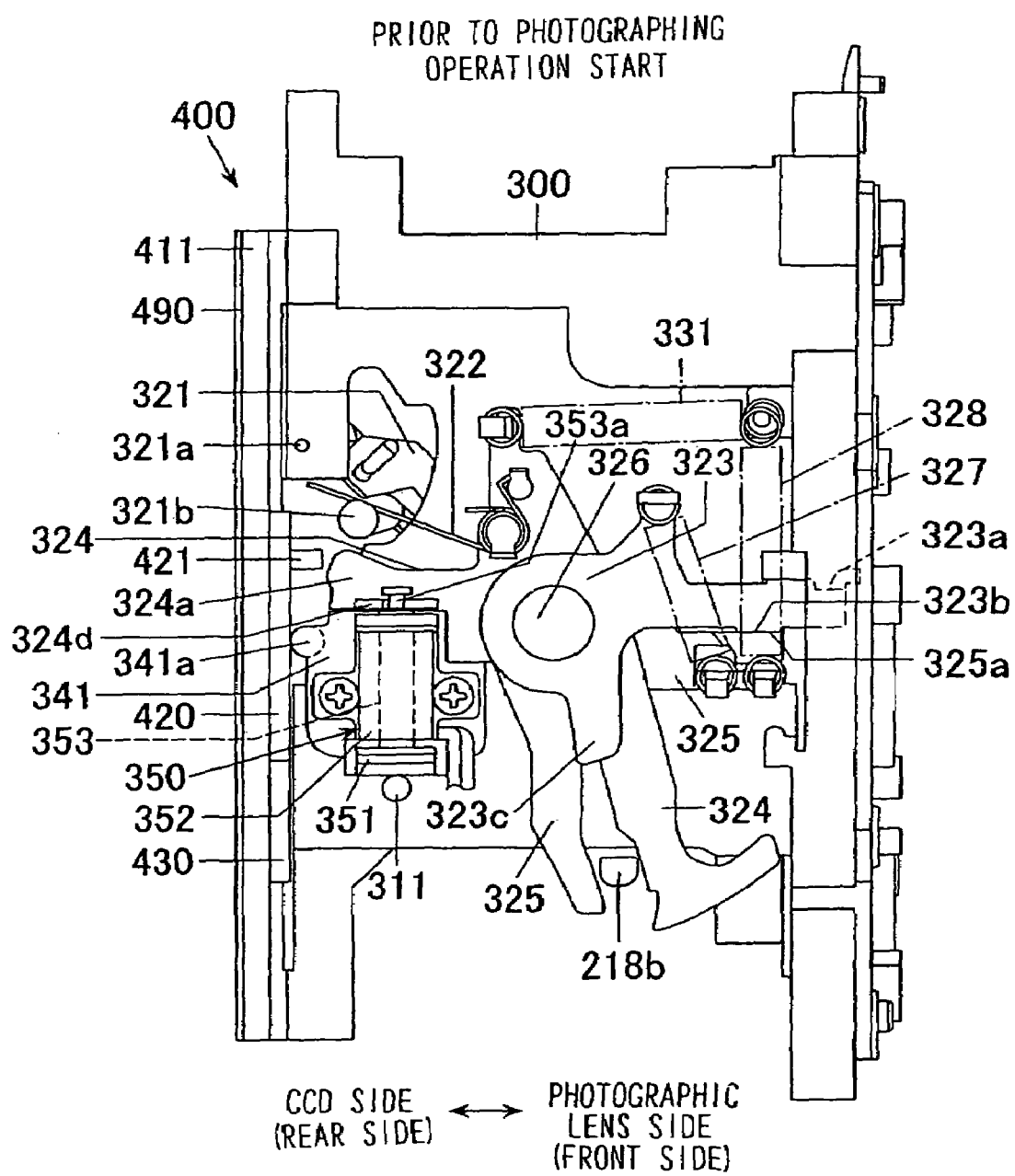
FIG. 14 is a side view of the mirror box and the shutter mechanism prior to the photographing operation start.
Figure 15:
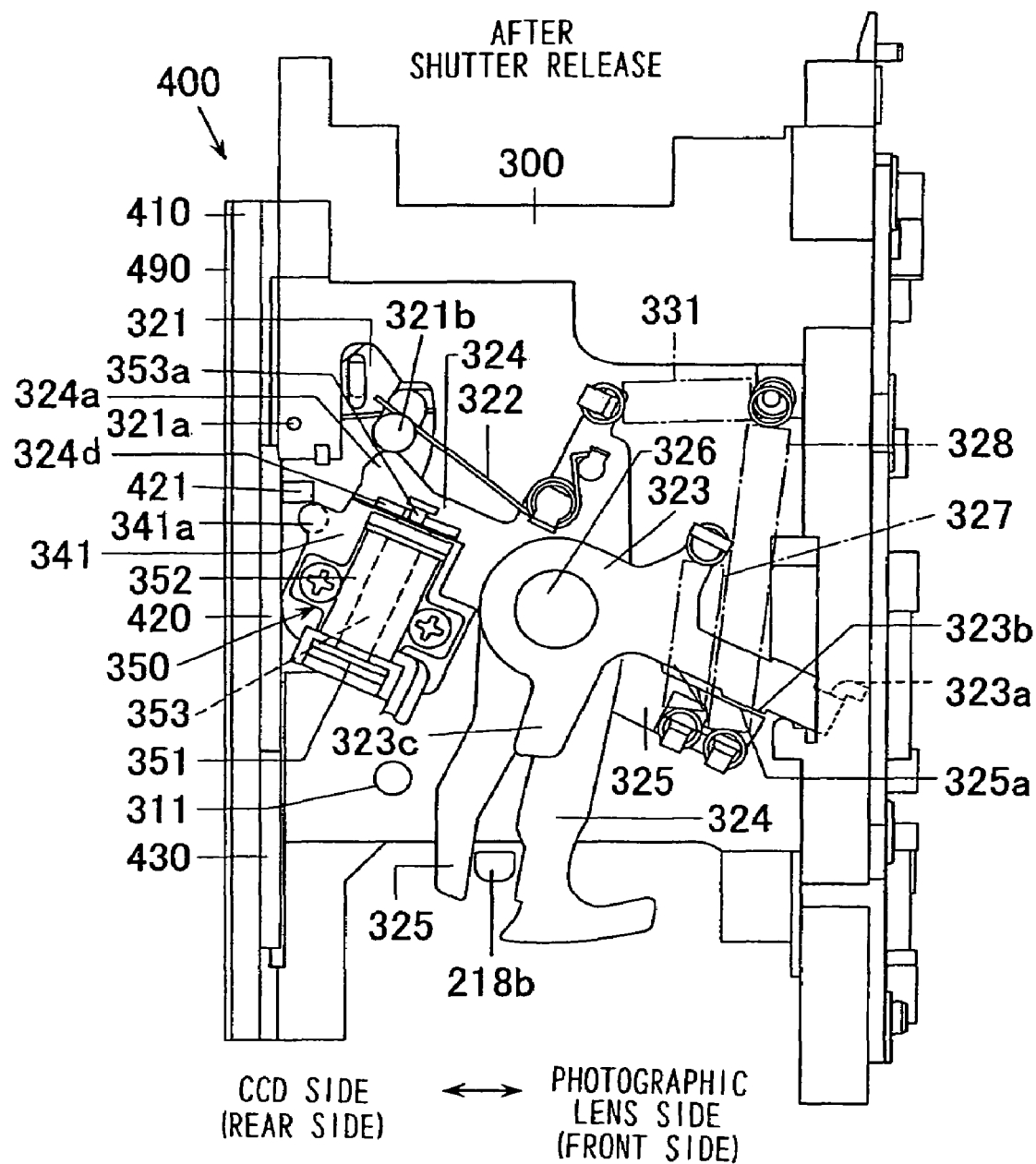
FIG. 15 is a side view of the mirror box and the shutter mechanism after the shutter release.
Figure 16:
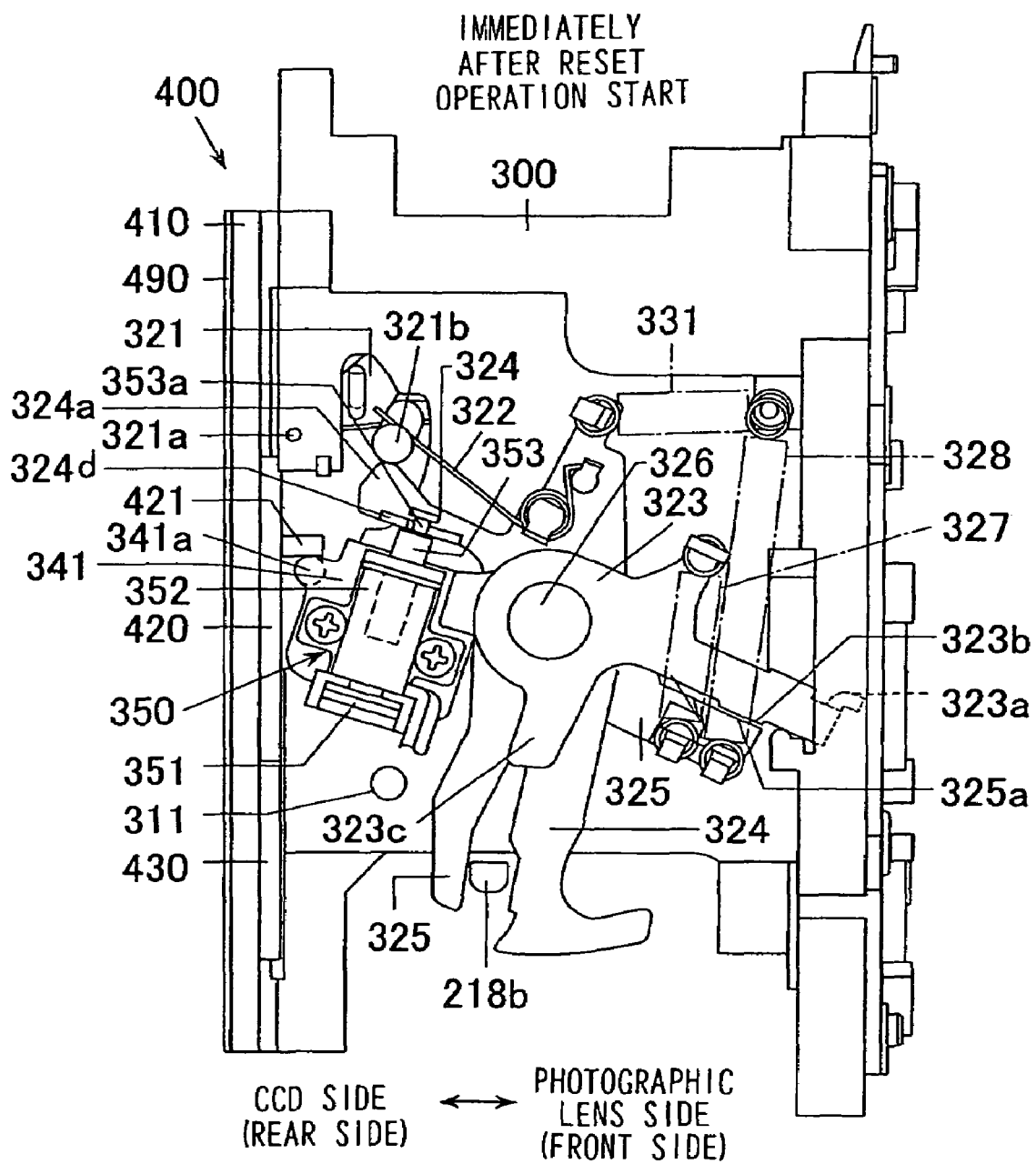
FIG. 16 is a side view of the mirror box and the shutter mechanism immediately after the start of a reset operation.

FIGS. 12 and 13 are perspectives showing a mirror box, an aperture mechanism and a shutter mechanism built into the camera body 1. In addition, FIGS. 14 through 16 provide side views of the mirror box and the shutter mechanism, with FIG. 14 showing a state prior to the photographing operation start, FIG. 15 showing a state after the shutter release and FIG. 16 showing the state immediately after the reset operation is started following the shutter release. Inside the mirror box 300, a main mirror 321 is disposed (see FIGS. 12 and 13). A shaft 326 is disposed at a side surface of the mirror box 300 and an aperture interlock lever 323, a mirror-up lever 324, an aperture drive lever 325 and a shutter charge lever 341 are rotatably mounted at the shaft 326. In addition, an aperture control mechanism 200 and a shutter mechanism 400 to be detailed later are mounted at the mirror box 300.

The main mirror 321 is driven between two positions, i.e., a down position assumed in the photographic optical path 301 to guide the subject image to a viewfinder (not shown) and an up position assumed outside the photographic optical path 301 to allow the subject image to pass to the CCD 5. The main mirror 321 is rotatably supported at the mirror box 300 via a mirror spindle 321a and as a force is applied to the main mirror 321 by a mirror-down spring 322 along the clockwise direction in the figures, it becomes held at a mirror receptacle (not shown) at an approximately 45° tilt (mirror-down position) As the mirror-up lever 324 to be detailed later drives a mirror drive pin 321b formed as an integrated part of the main mirror 321, the main mirror 321 is caused to rotate upward from the mirror-down position to assume the mirror-up position along the counterclockwise direction. The mirror down spring 322 having one end thereof held at the mirror-up lever 324 and the other end thereof held at the mirror drive pin 321b of the main mirror 321 applies a force to the main mirror 321 in the clockwise direction in the figures, as described earlier.

A spring 327 applies a force along the clockwise direction in the figures to the aperture interlock lever 323 which controls the aperture at the photographic lens 2 so as to achieve a specific aperture value by driving the aperture lever 3 at the photographic lens 2 mounted at the camera body with its contact portion 323a. While the mirror is at the down position prior to the start of a photographing operation, a lever contact portion 323b of the aperture interlock lever 323 is in contact with a lever contact portion 325a of the aperture drive lever 325 to restrict the rotation of the aperture interlock lever 323 along the clockwise direction in the figures (turn to the right), and thus it is held at an angular position at which the aperture at the photographic lens 2 is set in an open state. In addition, a lever contact portion 323c is in contact with a transmission lever of the aperture mechanism 200 to be detailed later to hold the aperture interlock lever 323 at an angular position at which the aperture at the photographic lens 2 achieves a specific aperture value under the aperture control implemented during a mirror up operation.

The aperture drive lever 325, which drives the aperture interlock lever 323, is linked with the aperture interlock lever 323 via the spring 327 and is also linked with the mirror box 300 via a spring 328. As a front end portion 218b of the sequence drive lever 218 to be detailed later is driven to the left in FIG. 14, the aperture drive lever 325 is caused to rotate along the clockwise direction in the figure by the front end portion 218b of the sequence drive lever 218 and thus, the aperture interlock lever 323 is driven along the aperture closing direction (along the clockwise direction in the figures) via the spring 327. In addition, as the front end portion 218b of the sequence drive lever 218 is driven to the right in FIGS. 15 and 16, the aperture drive lever 325 is reset along the aperture opening direction (along the counterclockwise direction in the figure) by the spring 328 together with the aperture interlock lever 323 contacting the lever contact portion 325a.

The mirror-up lever 324 is used to drive a shutter charge lever 341 as explained later, as well as to raise and lower the main mirror 321, and includes a mirror drive end 324a and a moving core holding end 324d. A force is applied along the clockwise direction in FIGS. 14 through 16 by a mirror-up spring 331 to the mirror-up lever 324 and the position to which it rotates along the clockwise direction in the figures is regulated with the front end portion 218b of the sequence drive lever 218 to be detailed later. As the front end portion 218b of the sequence drive lever 218 is driven to the left in FIG. 14, the mirror-up lever 324 is caused to rotate along the clockwise direction in the figure by the mirror-up spring 331 thereby driving the mirror drive pin 321b with its mirror drive end 324a to cause the main mirror 321 to rotate upward along the counterclockwise direction from the mirror-down position. As the front end portion 218b of the sequence drive lever 218 is driven to the right in FIG. 16, the mirror-up lever 324 is caused to rotate along the counterclockwise direction in the figures by the front end portion 218b of the sequence drive lever 218 against the force applied from the mirror-up spring 331. As the mirror-up lever 324 rotates along the counterclockwise direction in the figure, the mirror down spring 322 drives the mirror drive pin 321b downward, thereby driving the main mirror 321 to the mirror-down position along the clockwise direction in the figure.

The shutter charge lever 341, which is used to drive a switching lever 420 disposed at the shutter mechanism 400 to be detailed later, includes a shutter drive end 341a. A combination magnet 350 is mounted at the shutter charge lever 341. The combination magnet 350 includes a permanent magnet 351, an exciting coil 352 and a moving core 353 inserted at a through hole at an exciting coil bobbin around which the exciting coil 352 is wound.

The magnetic force imparted from the permanent magnet 351 attracts one end of the moving core 353 inserted at the through hole toward the permanent magnet. As a voltage is applied to the exciting coil 352 along a specific direction, a magnetic field which cancels out the magnetic field (magnetic force) attributable to the permanent magnet 351 is generated and, as a result, the moving core 353 having been magnetically held to the permanent magnet is released. Once the moving core 353 having been released becomes separated from the permanent magnet 351 over a predetermined distance, the moving core 353 remains separated from the permanent magnet 351 even though the exciting coil 352 is in an unexcited state. An engaging groove portion 353a extending along the circumferential direction is formed at the other end of the moving core 353. This engaging groove portion 353a engages the moving core holding end 324d of the mirror-up lever 324.

As shown in FIGS. 14 through 16, a pin 311 projects at a side surface of the mirror box 300 and this pin 311 regulates the angular position of the shutter charge lever 341 when it rotates along the counterclockwise direction. As shown in FIG. 14, as the mirror-up lever 324 is caused to rotate along the counterclockwise direction in the figure with the front end portion 218b of the sequence drive lever 218, the moving core 353 having been engaged with the moving core holding end 324d becomes attracted to the permanent magnet 351. In other words, while the mirror-up lever 324 rotates along the counter clockwise direction in the figure, the lower end portion of the combination magnet 350 comes into contact with the pin 311 and the moving core 353 becomes attracted to the permanent magnet 351, as show in FIG. 14.

While the combination magnet 350 is magnetically holding the moving core 353, the shutter charge lever 341 and the mirror-up lever 324 are engaged with each other via the combination magnet 350 and are together driven to rotate as one, as shown in FIGS. 14 and 15. Thus, as the front end portion 218b of the sequence drive lever 218 is driven to the left in FIG. 14, the mirror-up lever 324 and the shutter charge lever 341 are caused to rotate along the clockwise direction in the figure by the mirror-up spring 331.

As the mirror-up lever 324 and the shutter charge lever 341 are caused to rotate along the clockwise direction in the figure by the mirror-up spring 331, the mirror drive pin 321b is driven with the mirror drive end 324a, thereby causing the main mirror 321 to rotate upward along the counterclockwise direction from the mirror-down position (see FIGS. 14 and 15). At this time, the shutter charge lever 341 rotating together with the mirror-up lever 324 drives the shutter drive boss 421 at the switching lever 420 disposed at the shutter mechanism 400 in the upward direction in the figures to open the shutter blades as detailed later. It is to be noted that the level of the force with which the permanent magnet 351 holds the moving core 353 is set by ensuring that the permanent magnet 351 and the moving core 353 do not become disengaged from each other even if the shutter drive boss 421 is driven by the shutter charge lever 341 rotating together with the mirror-up lever 324.

As shown in FIG. 15, as a voltage is applied to the exciting coil 352 along a specific direction while the shutter charge lever 341 drives the shutter drive boss 421 in the upward direction in the figure, the moving core 353 having been held onto the permanent magnet 351 becomes released and, as a result, the shutter charge lever 341 becomes able to rotate along the counterclockwise direction in the figure relative to the mirror-up lever 324. As detailed later, a force is applied to the shutter drive boss 421 along the downward direction in the figure and thus, the shutter drive boss 421 presses the shutter drive end 341a downward thereby causing the shutter charge lever 341 to rotate along the counterclockwise direction, as shown in FIG. 16.

Aperture Control Mechanism 200

Figure 17:
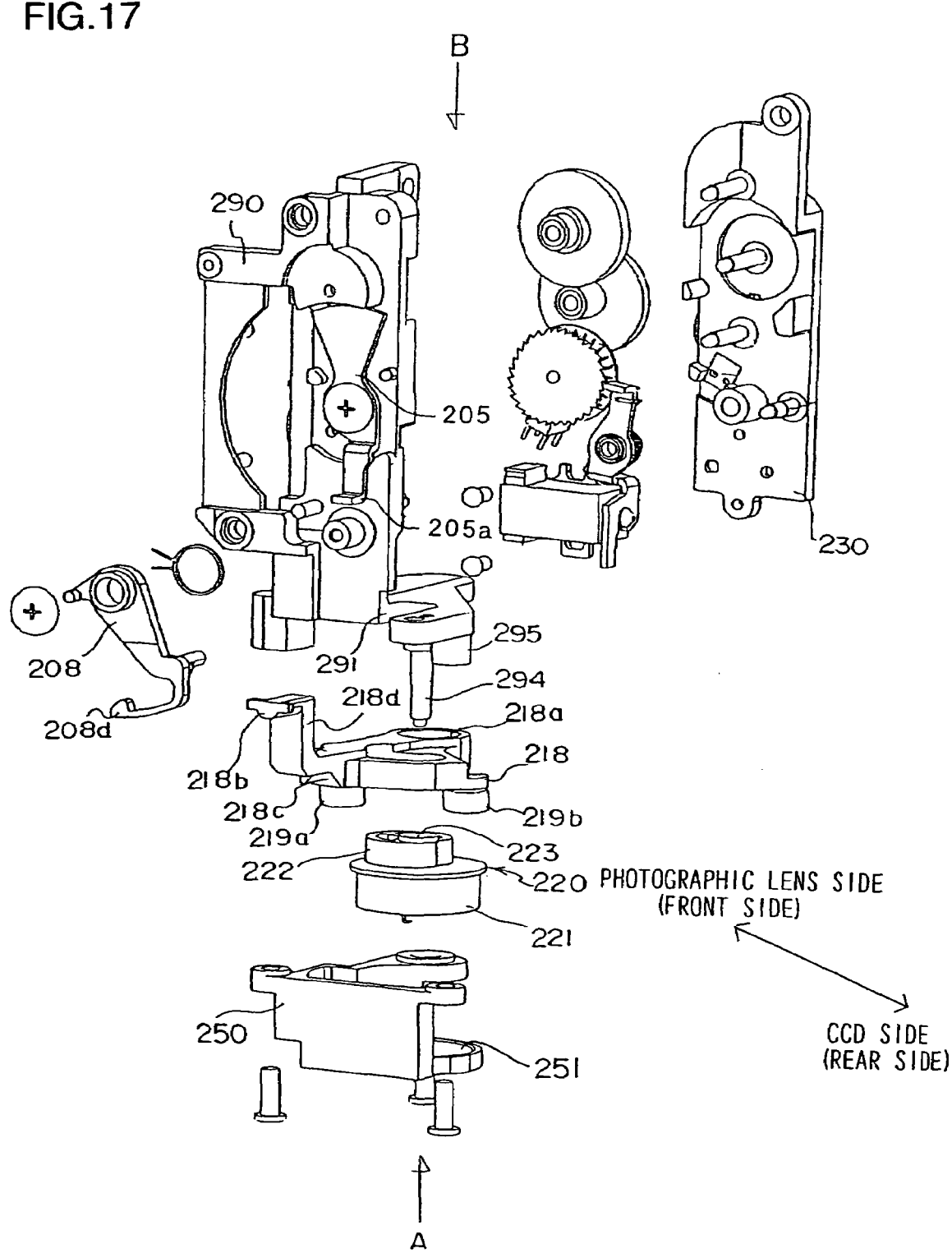
FIG. 17 is a perspective on the aperture mechanism.

FIG. 17 is a perspective on the aperture mechanism 200. The aperture mechanism 200 is constituted with a control substrate 230 and a drive substrate 290 both having various parts disposed there at. At the control substrate 230, various parts used to control the aperture value are disposed. At the drive substrate 290, the control substrate 230 described above, various parts related to the aperture mechanism, a transmission lever 205, a reset lever 208, the sequence drive lever 218, a cam 220 and a lid substrate 250 are mounted.

The transmission lever 205 transmits the extent to which the aperture interlock lever 323 is driven to the aperture mechanism 200 so as to enable the aperture mechanism 200 to detect the aperture value at the photographic lens 2. It is axially supported at a shaft disposed at the drive substrate 290 so as to be allowed to rotate freely, with a lower end 205a thereof placed in contact with the lever contact portion 323c of the aperture interlock lever 323. The detection of the aperture value at the photographic lens 2, which is executed with the aperture mechanism 200, is not explained.

While a detailed explanation is not provided, the reset lever 208 axially supported so as to be allowed to rotate freely at a shaft disposed at the drive substrate 290, is driven by the sequence drive lever 218 to be detailed later to reset the aperture control mechanism 200.

Figure 19A:
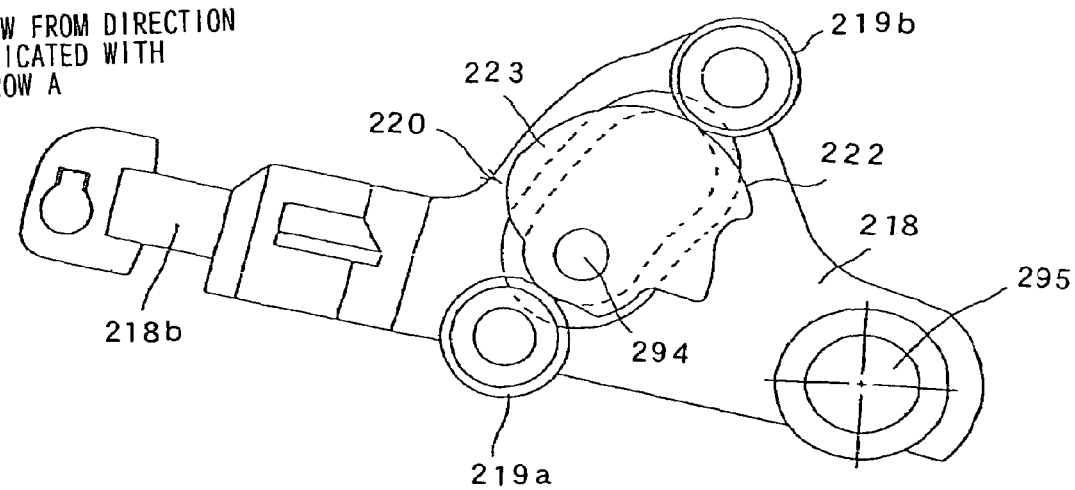
FIGS. 19A and 19B show the relationship between the sequence drive lever and the rotational phase of the cam after the shutter release with FIG. 19A showing the sequence drive lever viewed from the bottom side of the camera body (viewed from the direction indicated with the arrow A in FIG. 17) and FIG. 19B showing the sequence drive lever viewed from the top side of the camera body (viewed from the direction indicated with the arrow B in FIG. 17)
Figure 19B:
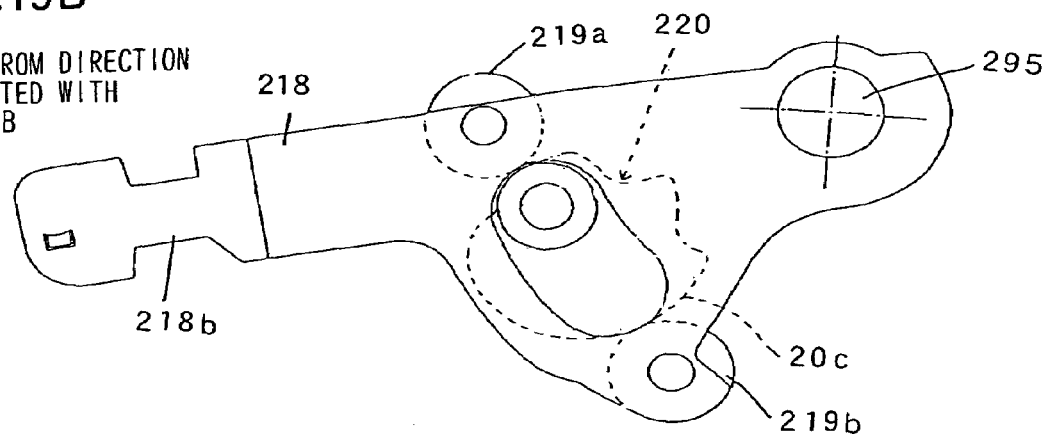

The sequence drive lever 218 is axially supported so as to be allowed to rotate relative to a shaft 295 disposed on the lower end side of the drive substrate 290. FIGS. 18A and 18B show the relationship between the sequence drive lever 218 and the rotational phase of the cam 220 prior to the photographing operation start. In addition, FIGS. 19A and 19B show the relationship between the sequence drive lever 218 and the rotational phase of the cam 220 following the shutter release. FIGS. 18A and 19A each show the sequence drive lever 218 viewed from the bottom side of the camera body 1 (from the direction indicated with the arrow A in FIG. 17), whereas FIGS. 18B and 19B each show the sequence drive lever 218 viewed from the top side of the camera body 1 (from the direction indicated with the arrow B in FIG. 17).

In the aperture control mechanism 200, the sequence drive lever 218, the cam 220 and the like function as explained earlier in reference to the first embodiment.

Shutter Mechanism 400

Figure 21A:
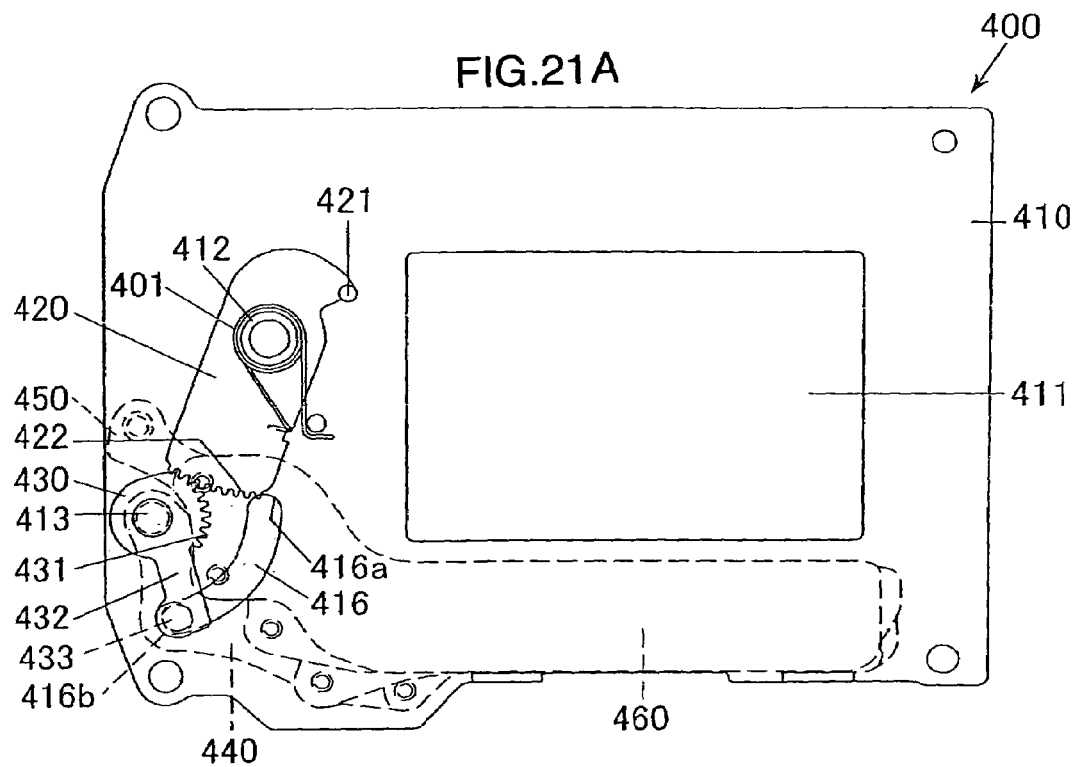
FIG. 21A is a front view of the shutter mechanism with the opening unshielded and FIG. 21B is a rear view of the inside of the shutter mechanism with the shutter cover plate removed.

FIGS. 20A and 20B and FIGS. 21A and 21B show the shutter mechanism 400. The shutter mechanism 400 includes a set of shutter blades engaged in opening/closing operation to switch to a closed state (see FIGS. 20A and 20B) in which the CCD 5 is shielded from light or an open state (see FIGS. 21A and 21B) in which the subject image is guided to the CCD 5. FIGS. 20A and 21A each show the shutter mechanism 400 viewed from the front, whereas FIGS. 20B and 21B each show the inside of the shutter mechanism 400 viewed from the rear side with a shutter cover plate 490 to be detailed later removed. The shutter mechanism 400 is mounted at the rear side of the mirror box 300.

The shutter mechanism 400 includes a base plate 410, the switching lever 420, a blade drive lever 430, a blade main arm 440, a blade slave arm 450, shutter blades 460 and the shutter cover plate 490. The base plate 410 is a substrate at which the various parts constituting the shutter mechanism 400 are disposed and an opening 411 through which the subject image is guided to the CCD 5 is formed at the base plate 410. At the surface of the base plate 410 on the front side, a switching lever rotating shaft 412 and a blade drive lever rotating shaft 413 are disposed. At the surface of the base plate 410 on the rear side, a blade main arm rotating shaft 414 and a blade slave arm rotating shaft 415 are disposed. At the rear side of the base plate 410, the shutter cover plate 490 having an opening 491 ranging over an area equal to the range of the opening 411 at the base plate 410 is mounted (see FIG. 13).

The switching lever 420 is axially supported at the switching lever rotating shaft 412 and a force is applied to the switching lever 420 along the clockwise direction in FIGS. 20A and 21A by a switching lever reset spring 401. At the front side of the switching lever 420 at one end thereof, the shutter drive boss 421 is disposed so as to rise upright. At the other end of the switching lever 420, a gear portion 422 having a gear cut therein is disposed. The gear portion 422 interlocks with a gear portion disposed at the blade drive lever 430 to be detailed later.

The length and the position of the shutter drive boss 421 are set so as to ensure that when the shutter mechanism 400 is mounted at the mirror box 300, the shutter drive boss comes in contact with the shutter drive end 341a of the rotated shutter charge lever 341. As the shutter drive boss 421 is pressed upward by the shutter drive end 341a of the rotated shutter charge lever 341, the switching lever 420 is caused to rotate along the counterclockwise direction in FIGS. 20A and 21A against the force applied from the switching lever reset spring 401.

The blade drive lever 430, axially supported at the blade drive lever rotating shaft 413, includes a gear portion 431 having a gear cut therein, an arm 432 extending from the rotational center (the blade drive lever rotating shaft 413) toward the outside along the radial direction and a blade drive pin 433 disposed at the rear side of the arm 432. As explained earlier, the gear portion 431 at the blade drive lever 430 interlocks with the gear portion 422 at the switching lever 420 and, as a result, the switching lever 420 and the blade drive lever 430 rotate by interlocking with each other. The front end of the blade drive pin 433 passes through a longitudinal hole 416 formed in the shape of a circular arc at the base plate 410 and fits in a fitting hole 441 of the blade main arm 440 to be detailed later. Since the blade drive pin 433 passes through the longitudinal hole 416, the ranges of rotation of the blade drive lever 430 and the switching lever 420 are regulated in correspondence to the length of the circular arc of the longitudinal hole 416 that regulates the range over which the blade drive pin 433 is allowed to move.

At the rear side of the base plate 410, the blade main arm 440 axially supported at the blade main arm rotating shaft 414, the blade slave arm 450 axially supported at the blade slave arm rotating shaft 415 and four shutter blades 460 that are driven in an interlocked state by the blade main arm 440 and the blade slave arm 450 are disposed. Namely, the four shutter blades 460 are driven in an interlocked state with an arm mechanism of the known art constituted with the blade main arm 440 and the blade slave arm 450, so as to shield or unshield the opening 411 at the base plate 410 and the opening 491 at the shutter cover plate 490. As the blade drive pin 433 fitted at the fitting hole 441 which is formed in the blade main arm 440 is driven along the inside of the longitudinal hole 416, the blade main arm 440 is caused to rotate around the blade main arm rotating shaft 414.

As the blade drive pin 433 fitted in the fitting hole 441 is driven upward along the inside of the longitudinal hole 416, the arms 440 and 450 are caused to rotate to the left in FIG. 20A (to the right in FIG. 20B), thereby pulling the shutter blades 460 upward to shield the openings 411 and 491. As the blade drive pin 433 fitted in the fitting hole 441 is driven downward along the inside of the longitudinal hole 416, the arms 440 and 450 are caused to rotate to the right in FIG. 20A (to the left in FIG. 20B), thereby pulling the shutter blades 460 downward to unshield the openings 411 and 491.

Since the switching lever reset spring 401 applies a force to the switching lever 420 in the clockwise direction in FIGS. 20A and 21A, a force is applied to the blade drive lever 430 interlocking with the switching lever 420 in the counterclockwise direction in FIGS. 20A and 21A. Thus, the force applied from the switching lever reset spring 401 drives the blade drive pin 433 upward along the inside of the longitudinal hole 416. As a result, the shutter blades 460 are pulled upward, thereby shielding the openings 411 and 491. It is to be noted that the upward movement of the blade drive pin 433 is regulated as the blade drive pin 433 comes in contact with an upper end portion 416a of the longitudinal hole 416, as shown in FIGS. 20A and 20B. As the blade drive pin 433 comes into contact with the upper end portion 416a, the shutter blades 460 shield the openings 411 and 491 (see FIGS. 20A and 20B).

Figure 21B:
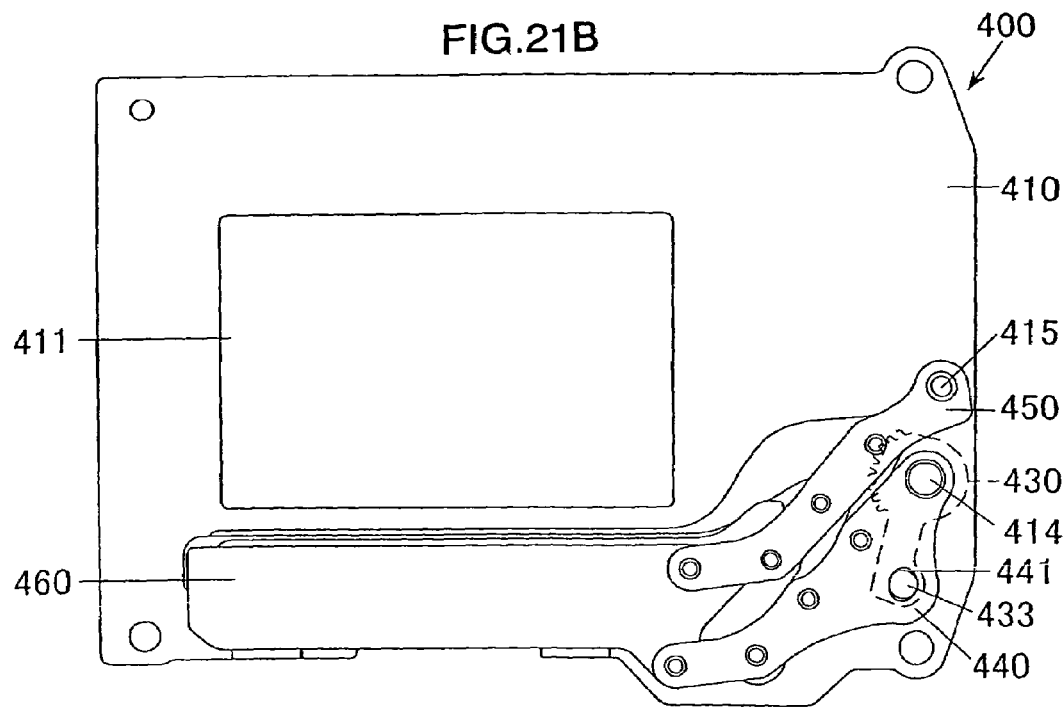

As the shutter drive boss 421 is pressed by the shutter drive end 324b of the rotated shutter charge lever 341 and the switching lever 420 is caused to rotate along the counterclockwise direction in FIGS. 20A and 21A against the force applied from the switching lever reset spring 401, the blade drive lever 430 interlocking with the switching lever 420 is caused to rotate along the clockwise direction in FIGS. 20A and 21A. Thus, the blade drive pin 433 is driven downward along the inside of the longitudinal hole 416, thereby causing the arms 440 and 450 to rotate to the right in FIG. 20A (to the left in FIG. 20B) and pulling the shutter blades 460 down. It is to be noted that while the blade drive pin 433 is allowed to move inside the longitudinal hole 416 until it comes in contact with a lower end portion 416b of the longitudinal hole 416, the four shutter blades 460 are all pulled further downward relative to the lower ends of the openings 411 and 491 immediately before the blade drive pin 433 comes in contact with the lower end portion 416b to unshield the openings 411 and 491 as shown in FIGS. 21A and 21B.

Namely, the shutter mechanism 400 achieved in the second embodiment engages in operation as described below as the shutter charge lever 341 rotates. It is to be noted that a separate explanation is to be provided later on how the angular position of the shutter charge lever 341 changes.

(1) If the shutter charge lever 341 assumes an angular position at which the shutter drive end 341a does not press against the shutter drive boss 421, the levers 420 and 430 are caused to rotate by the force applied from the switching lever reset spring 401 and the shutter blades 460 shield the openings 411 and 491 at the shutter mechanism 400 (see FIGS. 20A and 20B).

(2) As the shutter charge lever 341 rotates to press the shutter drive boss 421 upward with its shutter drive end 341a, the switching lever 420 is caused to rotate against the force applied from the switching lever reset spring 401 and, as a result, the shutter blades 460 are pulled down at the shutter mechanism 400.

(3) As the shutter drive end 341a further applies pressure to the shutter drive boss 421, the shutter blades 460 are pulled further downward relative to the lower ends of the openings 411 and 491, thereby unshielding the openings 411 and 491 at the shutter mechanism 400, as shown in FIGS. 21A and 21B.

Since the individual levers 420 and 430 and the individual arms 440 and 450 are disposed so as to assume the angular positions shown in FIGS. 20A and 20B and FIGS. 21A and 21B, the shutter drive boss 421 is allowed to move along a substantially vertical direction within a specific angle range around the switching lever rotating shaft 412 at the shutter mechanism 400 achieved in the second embodiment. It is to be noted that as described above, the angle range over which the shutter drive boss 421 is allowed to move is regulated in correspondence to the length of the circular arc of the longitudinal hole 416 that regulates the range over which the blade drive pin 433 is allowed to move.

In the structure described above, the shutter blades 460 are engaged in the opening/closing operations by conforming to the substantially vertical movement of the shutter drive boss 421 at the switching lever 420. Namely, in the electronic camera achieved in the second embodiment, the drive force imparted from the shutter drive end 341*a* at the shutter charge lever 341, i.e., the force applied from the mirror-up spring 331, is transmitted to the shutter blades 460 to engage the shutter blades 460 in the opening operation and also to charge the switching lever reset spring 401 that drives the shutter blades 460 during the closing operation.

At the shutter mechanism 400, the shutter blades 460 are switched to the open position or the closed position by amplifying the extent to which the shutter drive end 341*a* of the shutter charge lever 341 presses against the shutter drive boss 421 at the switching lever 420 to drive the shutter drive boss 421. Namely, the distance from the gear portion 422 of the switching lever 420 to the switching lever rotating shaft 412 constituting the rotational center is set greater than the distance from the shutter drive boss 421 to the switching lever rotating shaft 412, whereas the distance from the blade drive pin 433 to the blade drive lever rotating shaft 413 constituting the rotational center is set greater than the distance from the gear portion 431 of the blade drive lever 430 to the blade drive lever rotating shaft 413. Thus, the blade drive pin 433 can be moved by a great extent along inside of the longitudinal hole 416 even though the shutter drive end 341*a* is driven only by a small extent.

Photographing Operation

An explanation is now given on the operations of the individual parts executed while photographing an image with the electronic camera achieved in the second embodiment. FIG. 18A shows the state of the sequence drive lever 218 and the cam 220 before the photographing operation starts. With the cam surface 222 pressing against the roller 219*a*, the sequence drive lever 218 is first driven to rotate to the left and then is held in place. As shown in FIG. 17, the front end portion 218*b* of the sequence drive lever 218 is driven toward the front side of the camera body 1 viewed from the side and is then held in place.

The mirror-up lever 324 is caused to rotate to the left in FIG. 14 by the front end portion 218*b* against the force applied from the mirror-up spring 331. In this state, the mirror drive end 324*a* does not contact the mirror drive pin 321*b* at the main mirror 321 and the shutter drive end 324*b* does not contact the shutter drive boss 421 at the switching lever 420. Thus, the main mirror 321 assumes the mirror-down position and the shutter blades 460 shield the openings 411 and 491 (see FIGS. 20A and 20B).

The aperture drive lever 325 is caused by the spring 328 to rotate to the left in FIG. 14 together with the aperture interlock lever 323 which is in contact with its lever contact portion 325*a*. Thus, the lens aperture is in an open state before the photographing operation starts.

As a shutter release signal is input from the shutter release switch (not shown) in response to a depression of the shutter release button 4, the control circuit 101 drives the drive motor 122. As the drive motor 122 rotates, the cam 220 is caused to rotate to the left by approximately 180° to shift into the state shown in FIG. 19A from the state shown in FIG. 18A. After entering the state shown in FIG. 19A, the drive motor 122 stops. The cam surface 222 presses against the roller 219*b* to drive the sequence drive lever 218 so as to rotate it to the right.

The front end portion 218*b* of the sequence drive lever 218 moves from the front side to the rear side of the camera body 1 to shift from the state shown in FIG. 14 to the state shown in FIG. 15 and causes the aperture drive lever 325 to rotate to the right in FIG. 14. As the aperture drive lever 325 is caused to rotate to the right, the force applied from the spring 327 causes the aperture interlock lever 323 to start rotating to reduce the lens aperture from the open state.

Once the front end portion 218*b* moves to the rear side, the mirror-up lever 324 is caused to rotate to the right in FIG. 14 by the force applied from the mirror-up spring 331. Since the combination magnet 350 is still holding the moving core 353 in this state, the shutter charge lever 341 is caused to rotate to the right as one with the mirror-up lever 324. As the mirror-up lever 324 and the shutter charge lever 341 rotate to the right, the mirror drive end 324*a* first comes in contact with the mirror drive pin 321*b* of the main mirror 321, thereby rotating the main mirror 321 from the mirror-down position along the counterclockwise direction. As the mirror-up lever rotates further to the right, i.e., as the mirror up operation progresses, and the main mirror 321 rotates almost to the mirror-up position, the shutter drive end 341*a* comes into contact with the shutter drive boss 421 at the switching lever 420. As the mirror-up lever 324 and the shutter charge lever 341 rotate further to the right, the shutter drive end 341*a* presses the shutter drive boss 421 upward and thus, the shutter blades 460 are pulled downward as explained earlier.

When the mirror up operation is completed by rotating the mirror-up lever 324 to the right, as described above, i.e., in the post-shutter release state shown in FIG. 15, the shutter blades 460 are pulled further downward relative to the lower ends of the openings 411 and 491 and thus, the openings 411 and 491 are unshielded, as shown in FIGS. 21A and 21B.

Following the shutter release operation described above, the electrical charge storage at the CCD 5 is controlled with the electronic shutter which is controlled by the control circuit 101 and thus, the image is captured. Since the drive motor 122 is in a stopped state while the electrical charge storage at the CCD 5 is in progress, the cam 220 and the sequence drive lever 218, too, are in an off state. For this reason, the mirror-up lever 324 having rotated to the right by the force applied from the mirror-up spring 331 is held in place, and the shutter charge lever 341 is held in a stopped state while still pressing the shutter drive boss 421 upward with its shutter drive end 341*a*. Once the electrical charge storage at the CCD 5 is completed and the image is captured, a reset operation is executed to reset the individual parts. The following is an explanation of the reset operation.

To enable the reset operation, a drive signal for the drive motor 122 and an excitation signal for the combination magnet 350 are output from the control circuit 101 substantially simultaneously. As the exciting coil 352 becomes excited with the excitation signal provided by the control circuit 101, the permanent magnet 351 releases the moving core 353. In addition, as the drive motor 122 is driven again in response to the drive signal provided by the control circuit 101, the sequence drive lever 218 is driven thereby causing the mirror-up lever 324 to start rotating to the left as detailed later.

The length of time elapsing after the excitation signal is output from the control circuit 101 until the permanent magnet 351 in the combination magnet 350 releases the moving core 353 is smaller than the length of time elapsing after the drive signal for the drive motor 122 is output from the control circuit 101 until the sequence drive lever 218 starts drive. As a result, before the driven sequence drive lever 218 causes the mirror-up lever 324 to start rotating to the left, the force applied from the switching lever reset spring 401 causes the shutter drive boss 421 to press down on the shutter drive end 341a of the shutter charge lever 341 and the shutter blades 460 shield the openings 411 and 491. Namely, as shown in FIG. 16, before the sequence drive lever 218 starts to rotate to the left, the moving core 353 in the combination magnet 350 becomes released, thereby causing the shutter charge lever 341 to rotate to the left.

As the drive of the drive motor 122 resumes in response to the drive signal provided by the control circuit 101, the cam 220 in the state shown in FIG. 19A rotates to the left by approximately 180° to resume the state shown in FIG. 18A and then stops. With the cam surface 222 pressing on the roller 219a, the sequence drive lever 218 is driven to rotate to the left. At this time, the front end portion 218b moves from the rear end side to the front end side of the camera body 1 so as to switch from the state shown in FIG. 16 to the state shown in FIG. 14, causing the mirror-up lever 324 to rotate to the left in FIG. 16.

As the mirror-up lever 324 starts to rotate to the left, the main mirror 321 is caused to rotate to the right in FIG. 16 by the force applied at the other end of the mirror down spring 322 having one end thereof held at the mirror-up lever 324, and thus the main mirror 321 returns to the mirror-down position shown in FIG. 14. As the mirror-up lever 324 rotates further to the left, the mirror down operation ends, the main mirror 321 stops rotating to the right and the mirror drive end 324a departs the mirror drive pin 321b.

Since the leftward rotation of the shutter charge lever 341 is regulated with the pin 311, the moving core 353 held down as the mirror-up lever 324 rotates to the left is pressed down toward the permanent magnet 351. As shown in FIG. 14, once the leftward rotation of the mirror-up lever 324 is completed, the moving core 353 becomes held onto the permanent magnet 351 again.

Once the reset operation ends, the force applied from the spring 328 resets both the aperture interlock lever 323 and the aperture drive lever 325 so as to rotate them to the left, thereby setting the lens aperture in the open state.

The following advantages are realized through the electronic camera achieved in the second embodiment described above.

(1) The shutter blades 460 are engaged in the opening operation as the shutter drive boss 421 at the switching lever 420 is driven by rotating the mirror-up lever 324 and the shutter charge lever 341 with the force applied from the mirror-up spring 331 that imparts the mirror up drive force. In addition, before the mirror-up lever 324 starts rotating to the left, the moving core 353 in the combination magnet 350 is released, thereby allowing the shutter charge lever 341 to rotate to the left and engaging the shutter blades 460 in the opening operation with the force applied from the switching lever reset spring 401. Since this structure does not require a complicated drive mechanism for driving the shutter with specific timing, the number of parts required to drive the shutter blades 460 can be greatly reduced to achieve an electronic camera, a shutter mechanism and a mirror drive mechanism that allow the manufacturing costs to be lowered and facilitate efficient use of limited installation space in a miniaturized system.

(2) By rotating the mirror-up lever 324 and the shutter charge lever 341 with the force applied from the mirror-up spring 331 that imparts the mirror up drive force, the shutter drive boss 421 at the switching lever 420 is pressed upward to engage the shutter blades 460 in the opening operation and the switching lever reset spring 401, which is the drive source for the closing operation of the shutter blade 460, is charged. Since the switching lever reset spring 401 can be charged through a simple structure, the risk of potential failure of the shutter mechanism can be greatly reduced and thus, the reliability of the electronic camera is improved.

(3) While electrical charges are stored at the CCD 5, the charge force used to engage the shutter blades 460 in the closing operation is held by holding the shutter charge lever 341 with its shutter drive end 341a pressing the shutter drive boss 421 upward. Since this structure does not require a special mechanism for holding the lever driven against the force applied from the spring, the shutter mechanism is achieved through a simple structure, which allows the manufacturing costs to be lowered and facilitates efficient use of available space in a miniaturized system.

(4) Although the drive signal for the drive motor 122 and the excitation signal for the combination magnet 350 are output from the control circuit 101 substantially simultaneously, the use of the combination magnet 350 makes it possible to allow the shutter charge lever 341 to rotate to the left before the mirror-up lever 324 starts rotating to the left. As a result, since the shutter blades 460 start the closing operation before the mirror-up lever 324 starts rotating to the left, the openings 411 and 491 can be shielded promptly immediately after the electrical charge storage at the CCD 5 ends and the image-capturing operation at the CCD 5 ends. Consequently, the length of time over which the CCD 5 is exposed to the subject light outside of the electrical charge storage period is minimized and the extent of degradation in the image quality caused by the smear phenomenon and the like can be effectively minimized to allow the subject image achieving a high image quality to be recorded.

(5) Since the structure allows the opening/closing operation of the shutter blades 460 to follow the movement of the shutter drive boss 421 disposed at the switching lever 420 along a substantially vertical direction, the drive force imparted from the shutter drive end 341a of the shutter charge lever 341 is directly transmitted to the shutter blades 460. As a result, the shutter blades 460 can be driven through a simple movement of the shutter drive end 341a at the shutter charge lever 341 which allows the mirror-side mechanism that supplies the motive force for driving the shutter blades 460 to the shutter mechanism 400 to assume a simple structure. Since a mirror-side mechanism achieved by only slightly modifying the design of the mirror-side mechanism in the related art can be utilized, the development cost can be lowered.

(6) The shutter 460 is opened/closed by amplifying the extent by which the shutter drive boss 421 at the switching lever 420 is pressed and driven by the shutter drive end 341a of the shutter charge lever 341. As a result, it becomes possible to drive the shutter blades 460 with the mirror up drive force and thus, the design work can be simplified.

(7) The mirror-up lever 324 and the shutter charge lever 341 are used to drive the main mirror 321 and also to drive the shutter blades 460 in the opening/closing operation. Since the mirror-side mechanism used in the related art can be utilized with only a minimal modification such as the addition of the shutter charge lever 341 and the combination magnet 350, a high level of cost effectiveness is achieved.

Variations of Second Embodiment (1) While the combination magnet 350 is mounted at the shutter charge lever 341 and the moving core holding end 324d of the mirror-up lever 324 is held at the engaging groove portion 353a of the moving core 353 in the explanation provided above in reference to the second embodiment, the present invention is not limited to this example. For instance, by reversing the positional arrangement described above, the combination magnet 350 may be mounted at the mirror-up lever 324 and the engaging groove portion 353a of the moving core 353 may be engaged at the shutter charge lever 341. It is desirable to minimize the inertial moment at the shutter charge lever 341 to assure a sufficiently quick response during the closing operation of the shutter blades 460.

(2) While the mirror-up lever 324 and the shutter charge lever 341 are allowed to rotate together as one by holding the shutter charge lever 341 to the mirror-up lever 324 with the combination magnet 350 in the explanation provided above, the present invention is not limited to this example. For instance, the shutter charge lever 341 may be held onto the mirror-up lever 324 by using another type of actuator instead of the combination magnet 350, and the shutter charge lever 341 and the mirror-up lever 324 held to each other may then be released by starting up the actuator.

(3) While the moving core 353 is released by supplying power to the exciting coil 352 of the combination magnet at the start of the reset operation in the explanation provided above, the present invention is not limited to this example. For instance, when engaging the shutter blades 460 in the opening operation, power may be supplied to the exciting coil to drive the moving core so as to hold the shutter charge lever 341 and the mirror-up lever 324 together, whereas the power supply to the exciting coil may be stopped to release the moving core so as to disengage the shutter charge lever 341 and the mirror-up lever 324 from each other when engaging the shutter blades 460 in the closing operation.

(4) While the shutter charge lever 341 and the mirror-up lever 324 held together are released from each other by releasing the moving core 353 in the combination magnet 350 from the permanent magnet 351 in the explanation provided above, the present invention is not limited to this example. For instance, instead of the combination magnet 350, an actuator capable of driving a plunger-like member equivalent to the moving core 353 forward/backward may be utilized. In the structure that uses such an actuator instead of the combination magnet 350, the mirror-up lever 324 and the shutter charge lever 341 are allowed to rotate as one while the plunger-like member is in a retracted state. In addition, as the plunger-like member extends, the shutter charge lever 341 is allowed to rotate to the left relative to the mirror-up lever 324.

In the structure described above, the shutter blades 460 may be engaged in the closing operation by driving the shutter drive boss 421 downward with the drive force with which the plunger-like member extends out. Since the shutter blades 460 are closed with the drive force with which the plunger-like member extends out, the structure does not require the switching lever reset spring 401.

(5) While the drive signal for the drive motor 122 and the excitation signal for the combination magnet 350 are output from the control circuit 101 substantially simultaneously to enable the reset operation in the explanation provided above, the present invention is not limited to this example. As long as the openings 411 and 491 are shielded promptly immediately after the electrical charge storage and the image-capturing operation at the CCD 5 end, e.g., as long as the shutter blades 460 can start moving to shield the openings 411 and 491 before the main mirror 321 starts moving toward the mirror-down position, the drive signal for the drive motor 122 and the excitation signal for the combination magnet 350 may be output at different times.

As explained above, the length of time elapsing after the excitation signal is output from the control circuit 101 until the permanent magnet 351 in the combination magnet 350 releases the moving core 353 is set smaller than the length of time elapsing after the drive signal for the drive motor 122 is output from the control circuit 101 until the sequence drive lever 218 starts drive. Accordingly, by taking into consideration the delay occurring after the drive signal for the drive motor 122 is output until the sequence drive lever starts drive, the drive signal for the drive motor 122 may be output from the control circuit 101 sooner. Alternatively, the control circuit 101 may output the excitation signal for the combination magnet 350 first so as to effectively prevent any degradation in the image quality by minimizing the length of time over which the CCD 5 is exposed to the subject light outside the electrical charge storage period. The advantages of the embodiment are realized regardless of which signal is output first.

(6) The specific features of the embodiment and the individual variations may be adopted in combination.

The second embodiment described above includes a shutter drive mechanism that engages the shutter blades in the opening direction by using a first drive force, i.e., the drive force used to raise the mirror with the mirror drive mechanism, and engages the shutter blades in the closing operation by using a second drive force different from the first drive force and a startup mechanism that starts the closing operation of the shutter blades with the second drive force before starting the mirror down operation. As this structure enables drive of the shutter blades without having to use an actuator or a complex drive mechanism for shutter drive, the number of parts required for shutter blade drive can be greatly reduced, and thus, an electronic camera that facilitates efficient use of limited available space in a miniaturized system in which the image-capturing element is promptly shielded from light once the electrical charge storage ends, can be provided at lower manufacturing costs efficiently.

The above described embodiments are examples, and various modifications can be made without departing from the spirit and scope of the invention.

What is claimed is:
1. An electronic camera, comprising:
a mirror that is driven to one of a down position placing the mirror in a photographic optical path to guide a subject image to a viewfinder and an up position placing the mirror outside the photographic optical path to allow the subject image to pass to an image-capturing element;
a set of shutter blades to be engaged in an opening/closing operation to enter one of a closed state in which the image-capturing element is shielded from light and an open state in which the subject image is guided to the image-capturing element;
a drive source that outputs a drive force to be used to drive the mirror;
a mirror drive mechanism that transmits the drive force generated at the drive source to the mirror; and
a shutter drive mechanism that engages the shutter blades in the opening operation by using a drive force used to raise the mirror with the mirror drive mechanism.
2. An electronic camera according to claim 1, wherein:
the opening operation of the shutter blades starts immediately before the mirror driven to switch from the down position to the up position assumes the up position and is completed by the time the mirror assumes the up position.

3. An electronic camera according to claim 1, wherein:
a drive force with which the shutter blades are engaged in the closing operation by following a mirror down operation is charged by the shutter drive mechanism through use of the drive force with which the mirror is raised by the mirror drive mechanism.

4. A shutter device of an electronic camera comprising:
a set of shutter blades to be engaged in an opening/closing operation to enter one of a closed state in which an image-capturing element is shielded from light and an open state in which a subject image is guided to the image-capturing element; and
a shutter drive mechanism that engages the shutter blades in the opening operation by using a drive force used to raise a mirror with a mirror drive mechanism that drives the mirror from a down position placing the mirror in a photographic optical path to guide the subject image to a viewfinder to an up position placing the mirror outside the photographic optical path to allow the subject image to pass to the image-capturing element, wherein:
the shutter drive mechanism includes an opening member that engages the shutter blades in the opening operation by transmitting the drive force from the mirror drive mechanism to the shutter blades.

5. A shutter device according to claim 4, wherein:
the shutter drive mechanism further includes an amplifying mechanism that engages the shutter blades in operation by amplifying an extent of the drive force input thereto when transmitting the drive force from the mirror drive mechanism to the shutter blades.

6. A mirror drive device of an electronic camera comprising:
a mirror that is driven to one of a down position placing the mirror in a photographic optical path to guide a subject image to a viewfinder and an up position placing the mirror outside the photographic optical path to allow the subject image to pass to an image-capturing element; and
a mirror drive mechanism that transmits a drive force generated at a drive source to the mirror, wherein:
the mirror drive mechanism includes a transmission member that communicates a drive force for raising the mirror to a shutter drive mechanism that engages a set of shutter blades in an opening operation so as to guide the subject image to the image-capturing element by using the drive force used to raise the mirror with the mirror drive mechanism.

7. A mirror drive device according to claim 6, wherein:
the mirror drive mechanism transmits to the shutter drive mechanism the drive force used to raise the mirror immediately before the mirror driven to switch from the down position to the up position actually assumes the up position.

8. An electronic camera, comprising:
a mirror that is driven to one of a down position placing the mirror in a photographic optical path to guide a subject image to a viewfinder and an up position placing the mirror outside the photographic optical path to guide the subject image to an image-capturing element;
a set of shutter blades to be engaged in an opening/closing operation to enter one of a closed state in which the image-capturing element is shielded from light and an open state in which the subject image is guided to the image-capturing element;
a drive source that outputs a drive force to be used to drive the mirror;
a mirror drive mechanism that transmits the drive force generated at the drive source to the mirror; and
a shutter drive mechanism that engages the shutter blades in the closing operation by using a drive force used to lower the mirror with the mirror drive mechanism.

9. An electronic camera according to claim 8, wherein:
the opening operation of the shutter blades starts immediately before the mirror driven to switch from the down position to the up position assumes the up position and is completed by the time the mirror assumes the up position.

10. An electronic camera according to claim 8, wherein:
a drive force with which the shutter blades are engaged in the opening operation by following a mirror up operation is charged with the shutter drive mechanism through use of the drive force with which the mirror is lowered by the mirror drive mechanism.

11. A shutter device of an electronic camera comprising:
a set of shutter blades to be engaged in an opening/closing operation to enter one of a closed state in which an image-capturing element is shielded from light and an open state in which a subject image is guided to the image-capturing element; and
a shutter drive mechanism that engages the shutter blades in the closing operation by using a drive force used to lower a mirror with a mirror drive mechanism that drives the mirror from an up position placing the mirror outside a photographic optical path to allow the subject image to pass to the image-capturing element to a down position placing the mirror in the photographic optical path to guide the subject image to a viewfinder, wherein:
the shutter drive mechanism includes a closing member that engages the shutter blades in the closing operation by transmitting the drive force from the mirror drive mechanism to the shutter blades.

12. A shutter device according to claim 11, wherein:
the shutter drive mechanism further includes an amplifying mechanism that engages the shutter blades in operation by amplifying an extent of the drive force input thereto when transmitting the drive force from the mirror drive mechanism to the shutter blades.

13. A mirror drive device of an electronic camera comprising:
a mirror that is driven to one of a down position placing the mirror in a photographic optical path to guide a subject image to a viewfinder and an up position placing the mirror outside the photographic optical path to allow the subject image to pass to an image-capturing element; and
a mirror drive mechanism that transmits a drive force generated at a drive source to the mirror, wherein:
the mirror drive mechanism includes a transmission member that communicates a drive force for lowering the mirror to a shutter drive mechanism that engages a set of shutter blades in a closing operation so as to shield the image-capturing from light by using the drive force used to lower the mirror with the mirror drive mechanism.

14. An electronic camera, comprising:
a mirror that is driven to one of a down position placing the mirror in a photographic optical path to guide a subject image to a viewfinder and an up position placing the mirror outside the photographic optical path to allow the subject image to pass to an image-capturing element;

a set of shutter blades to be engaged in an opening/closing operation to enter one of a closed state in which the image-capturing element is shielded from light and an open state in which the subject image is guided to the image-capturing element;

a drive source that outputs a drive force to be used to drive the mirror;

a mirror drive mechanism that transmits the drive force generated at the drive source to the mirror; and a shutter drive mechanism that uses a drive force used to raise the mirror with the mirror drive mechanism to engage the shutter blades in the opening operation and uses a drive force used to lower the mirror with the mirror drive mechanism to engage the shutter blades in the closing operation.

15. An electronic camera according to claim 14, wherein:
the opening operation of the shutter blades starts immediately before the mirror driven to switch from the down position to the up position assumes the up position and is completed by the time the mirror member assumes the up position.

16. A shutter device of an electronic camera comprising:
a set of shutter blades to be engaged in an opening/closing operation to enter one of a closed state in which an image-capturing element is shielded from light and an open state in which a subject image is guided to the image-capturing element; and a shutter drive mechanism that engages the shutter blades in the opening operation by using a drive force used to raise a mirror with a mirror drive mechanism so as to drive the mirror to an up position placing the mirror outside a photographic optical path to allow the subject image to pass to the image-capturing element and that engages the shutter blades in the closing operation by using a drive force used to lower the mirror with the mirror drive mechanism so as to drive the mirror to a down position placing the mirror in the photographic optical path to guide the subject image to a viewfinder, wherein:

the shutter drive mechanism includes an opening/closing member that engages the shutter blades in the opening/closing operation by transmitting the drive force from the mirror drive mechanism to the shutter blades.

17. A shutter device according to claim 16, wherein:
the shutter drive mechanism further includes an amplifying mechanism that engages the shutter blades in operation by amplifying an extent of the drive force input thereto when transmitting the drive force from the mirror drive mechanism to the shutter blades.

18. A mirror drive device of an electronic camera comprising:
a mirror that is driven to one of a down position placing the mirror in a photographic optical path to guide a subject image to a viewfinder and an up position placing the mirror outside the photographic optical path to allow the subject image to pass to an image-capturing element; and a mirror drive mechanism that transmits a drive force generated at a drive source to the mirror, wherein:

the mirror drive mechanism includes a transmission member that transmits a drive force used to raise the mirror and a drive force used to lower the mirror with the mirror drive mechanism to a shutter drive mechanism that engages a set of shutter blades in an opening operation so as to guide the subject image to the image-capturing element by using the drive force used to raise the mirror and that engages the shutter blades in a closing operation so as to shield the image-capturing element from light by using the drive force used to lower the mirror.

19. A mirror drive device according to claim 18, wherein:
the mirror drive mechanism starts transmitting to the shutter drive mechanism the drive force for raising the mirror immediately before the mirror driven to switch from the down position to the up position actually assumes the up position.

20. An electronic camera, comprising:
a mirror that is driven to one of a down position placing the mirror in a photographic optical path to guide a subject image to a viewfinder and an up position placing the mirror outside the photographic optical path to guide the subject image to an image-capturing element;

a set of shutter blades to be engaged in an opening/closing operation to enter one of a closed state in which the image-capturing element is shielded from light and an open state in which the subject image is guided to the image-capturing element;

a drive source that outputs a drive force to be used to drive the mirror in response to one of a mirror up start signal and a mirror down start signal input thereto;

a mirror drive mechanism that transmits the drive force generated at the drive source to the mirror;

a shutter drive mechanism that engages the shutter blades in the opening operation by using a first drive force with which the mirror is raised with the mirror drive mechanism and engages the shutter blades in the closing operation by using a second drive force different from the first drive force; and a startup mechanism that starts the closing operation of the shutter blades with the second drive force ahead of a start of a mirror down operation of the mirror in response to a startup signal input thereto.

21. An electronic camera according to claim 20, wherein:
the second drive force is charged by using the first drive force.

22. An electronic camera according to claim 20, wherein:
if the mirror down start signal and the startup signal are output simultaneously, the startup mechanism starts the closing operation of the shutter blades before the mirror drive mechanism lowers the mirror.

23. An electronic camera according to claim 22, wherein:
the startup mechanism includes a combination magnet constituted with a permanent magnet and an electromagnetic coil.

* * * * *